United States Patent
Majima

[19]

[11] Patent Number: 5,886,802
[45] Date of Patent: Mar. 23, 1999

[54] WAVELENGTH CONTROL METHOD AND OPTICAL COMMUNICATION APPARATUS FOR PERFORMING WAVELENGTH DIVISION MULTIPLEX COMMUNICATION

[75] Inventor: Masao Majima, Isehara, Japan

[73] Assignee: Canon Kabushiki Kaisha, Tokyo, Japan

[21] Appl. No.: 934,634

[22] Filed: Sep. 22, 1997

Related U.S. Application Data

[63] Continuation of Ser. No. 619,334, Mar. 21, 1996, abandoned.

[30] Foreign Application Priority Data

Mar. 23, 1995 [JP] Japan .................................... 7-64156
Sep. 4, 1995 [JP] Japan .................................. 7-226487

[51] Int. Cl.$^6$ .................................................. H04J 14/02
[52] U.S. Cl. ........................... 359/124; 359/161; 359/187
[58] Field of Search ....................... 359/114, 124–125, 359/161, 152, 173, 187, 132–133, 120–121

[56] References Cited

U.S. PATENT DOCUMENTS

| | | | |
|---|---|---|---|
| 4,592,043 | 5/1986 | Williams | 370/3 |
| 4,800,555 | 1/1989 | Foschini | 370/3 |
| 4,989,201 | 1/1991 | Glance | 359/187 |
| 5,239,400 | 8/1993 | Liu | 359/125 |
| 5,301,052 | 4/1994 | Audovin et al. | 359/124 |
| 5,319,489 | 6/1994 | Audouin et al. | 359/124 |
| 5,589,970 | 12/1996 | Lezu et al. | 259/133 |

FOREIGN PATENT DOCUMENTS

| | | |
|---|---|---|
| 0 381 102 | 8/1990 | European Pat. Off. . |
| 0 438 153 | 7/1991 | European Pat. Off. . |
| 0 496 675 | 7/1992 | European Pat. Off. . |

OTHER PUBLICATIONS

C.M. Miller, "A Field–Worthy, High–Performance, Tunable Fiber Fabry–Perot Filter, " ECOC, pp. 605–608 (1990).

Y. Kotaki, et al., "Long Cavity λ/ 4 Shifted MQW–DFB Laser With Three Electrodes, " The Institute of Electronics, Information and Communication Engineers, OQE89–116 pp. 61–66.

G.J. Foschini, "Sharing of the Optical Band in Local Systems, " I.E.E.E. Journal on Selected Areas in Communications, vol. 6, No. 6, pp. 974–986.(1988).

*Primary Examiner*—Kinfe-michael Negash
*Attorney, Agent, or Firm*—Fitzpatrick, Cella, Harper & Scinto

[57] ABSTRACT

In an optical communication system for performing wavelength division multiplex communication on an optical transmission path, an output light wavelength control is performed as follows in an optical transmitter. A wavelength of light on the optical transmission path is detected so as to search for an unoccupied space, in which output light from the self optical transmitter does not cause an interference with another light on the optical transmission path. The wavelength of the output light from the self optical transmitter is controlled so as to be a wavelength falling within the unoccupied space. A wavelength of another light which is adjacent to the wavelength of the output light from the self optical transmitter on one of the longer and shorter wavelength side along a wavelength axis is set as a reference side wavelength, so that the wavelength of the output light is controlled to set a wavelength interval between the reference side wavelength and the wavelength of the output light from the self optical transmitter to be close to a predetermined first wavelength interval or to maintain the wavelength interval to have a value in the neighborhood of the predetermined first wavelength interval.

35 Claims, 18 Drawing Sheets

FIG. 6

OPERATION 1  OPTICAL SWITCH : OFF, LD : $\lambda emin$, OPTICAL FILTER : SWEEP FROM $\lambda fmin$ TO $\lambda fmax$

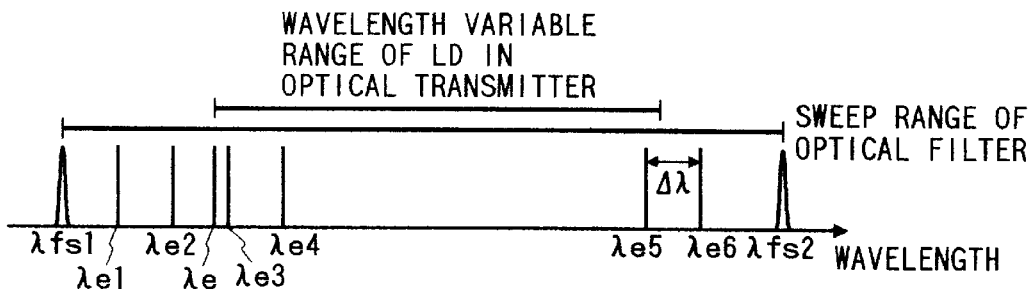

OPERATION 2  OPTICAL SWITCH OFF, LD : OFF, OPTICAL FILTER : SWEEP FROM $\lambda fmin$ TO $\lambda fmax$

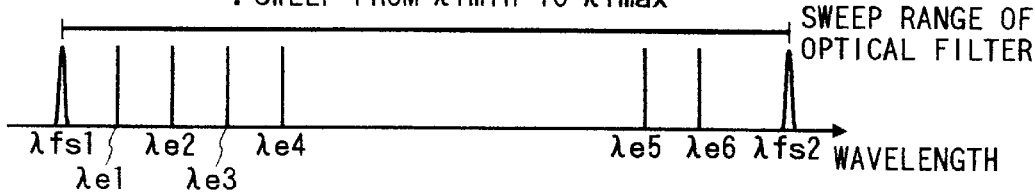

OPERATION 3  OPTICAL SWITCH : OFF, LD : SWEEP FROM $\lambda emin$ TO $\lambda f$, OPTICAL FILTER ; $\lambda ea1 + 1.2 \cdot \Delta\lambda$

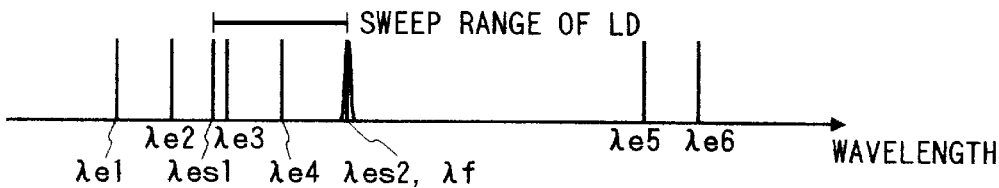

OPERATION 4  OPTICAL SWITCH : ON, OPTICAL FILTER : SWEEP FROM $\lambda e - 0.2\Delta\lambda$ TO $\lambda e + 1.2\Delta\lambda$ (a) LD : SHIFTED TO LONGER WAVELENGTH SIDE BY $0.1\Delta\lambda$

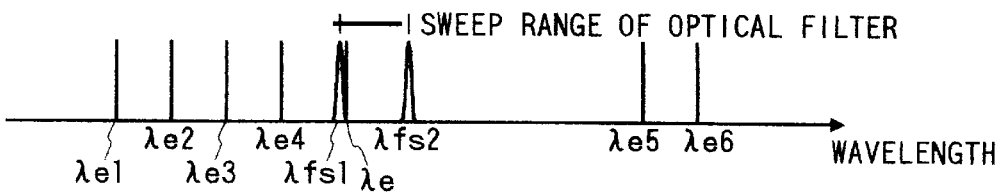

(b) LD : KEEP DIFFERENCE OF WAVELENGTHS $\lambda e5$ AND $\Delta\lambda$

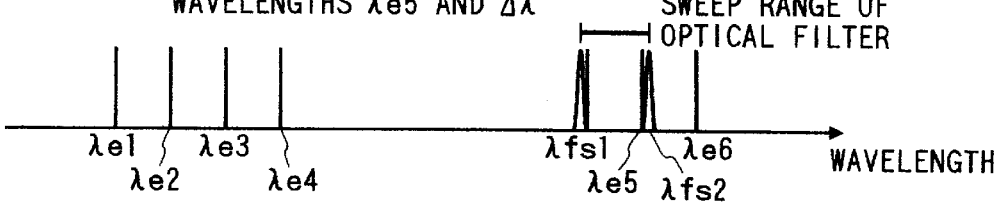

FIG. 11

OPERATION 1  OPTICAL SWITCH : OFF, LD : $\lambda emin$, OPTICAL FILTER : SWEEP FROM $\lambda fmin$ TO $\lambda fmax$

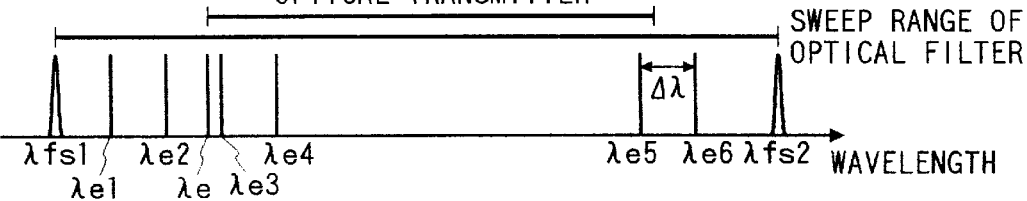

OPERATION 2  OPTICAL SWITCH OFF, LD : OFF, OPTICAL FILTER : SWEEP FROM $\lambda fmin$ TO $\lambda fmax$

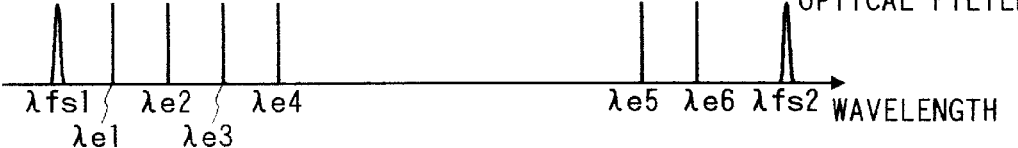

OPERATION 3  OPTICAL SWITCH : OFF, LD : SWEEP FROM $\lambda emin$ TO $\lambda f$, OPTICAL FILTER ; $\lambda eb2 - 1.2 \cdot \Delta\lambda$

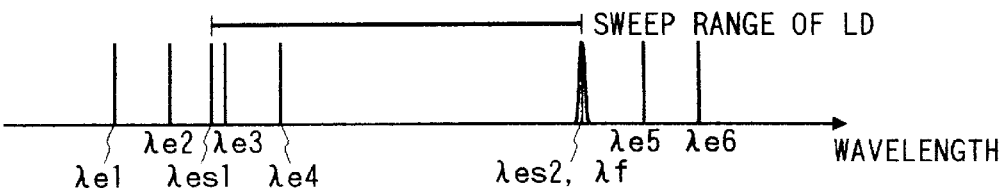

OPERATION 4  OPTICAL SWITCH : ON, LD : KEEP DIFFERENCE OF WAVELENGTHS $\lambda e5$ AND $\Delta\lambda$, OPTICAL FILTER : SWEEP FROM $\lambda e - 0.2\Delta\lambda$ TO $\lambda e + 1.2\Delta\lambda$

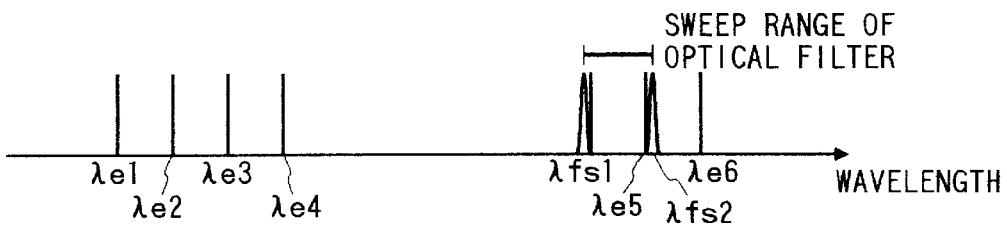

WAVELENGTH CONTROL METHOD AND OPTICAL COMMUNICATION APPARATUS FOR PERFORMING WAVELENGTH DIVISION MULTIPLEX COMMUNICATION

This application is a continuation of application Ser. No. 08/619,334, filed Mar. 21, 1996, now abandoned.

BACKGROUND OF THE INVENTION

1. Field of the Invention

The present invention relates to an optical communication system and, more particularly, to a wavelength control method in an optical communication system which performs wavelength division multiplex communications.

2. Related Background Art

A wavelength division multiplex communication system can assign a large number of independent channels in a single transmission path. This communication system is suitable for a multimedia communication that requires flexibility of the network since it does not require any multiplex on the time axis such as frame synchronization or the like, and the respective channels need not have identical transmission rates.

As an example of the wavelength division multiplex communication system, a system in which each terminal station has a pair of wavelength variable optical transmitter and receiver is known. A transmitting terminal station adjusts the wavelength of its wavelength variable light source to a wavelength which is not used in communications (i.e., a "channel" in the wavelength division multiplex communication). On the other hand, a receiving terminal station receives a signal by matching the central wavelength of the passband spectrum of an optical band-pass filter (to be referred to as an optical filter hereinafter; the central wavelength will be referred to as the wavelength of the optical filter hereinafter) of its optical receiver to the wavelength to be received. The wavelength range that can be utilized by the system is determined by the wavelength variable range of the optical transmitter and receiver. The wavelength interval between adjacent channels (to be referred to as a channel interval hereinafter) is determined by the width (bandwidth or half-width) of the passband spectrum of the optical filter of the optical receiver.

As the wavelength variable light source, a wavelength variable semiconductor laser (the semiconductor laser will be referred to as an LD hereinafter) can be used. In order to broaden the wavelength variable width, various studies have been made. An LD which has a practical level at present is of multi-electrode DBR (distributed Bragg reflector) type, and has a wavelength variable width of several nm. For example, an LD described in OQE89-116 a "Three-electrode length resonator λ/4 shift MQW-DFB laser", The Institute of Electronics, Information and Communication Engineers, is known. On the other hand, as a wavelength variable filter, a Fabry-Perot resonator type filter can be used. At the current practical level, the wavelength variable range is several tens of nm, and the spectral width is about 0.1 nm. For example, a filter described in ECOC'90-605 "A field-worthy, high-performance, tunable fiber Fabry-Perot filter" is known.

In such system, by narrowing the channel interval, a larger number of channels can be assured while the wavelength variable remains the same.

In order to efficiently use a limited wavelength range, the respective channels are preferably assigned at a high density. As a technique for attaining such channel assignment, a technique described in U.S. Pat. No. 5,301,052 is known. In this technique, one reference light source is arranged in a network and outputs reference light, and the wavelengths used by transmitting stations are assigned at predetermined intervals in turn from that of the reference light. Each wavelength is controlled to have a predetermined wavelength interval from the neighboring wavelength. After the neighboring wavelength of a given wavelength becomes nondetectable, the wavelengths are controlled to shift so as to maintain the predetermined intervals. However, this technique does not take into consideration a case wherein the respective transmitting stations in the network have different outputtable wavelength ranges. In practice, however, it is not easy to manufacture light sources having the same wavelength variable range.

SUMMARY OF THE INVENTION

It is, therefore, an object of the present invention to provide a wavelength control method which can efficiently assign wavelengths even when the respective transmitting stations have different outputtable wavelength ranges.

In order to achieve the above object, the present invention provides, as a wavelength control method, an output light wavelength control method for an optical transmitter which is used in an optical communication system for performing wavelength division multiplex communication on an optical transmission path, characterized by comprising the steps of:

detecting a wavelength of light on the optical transmission path;

searching for an unoccupied space, in which output light from the self optical transmitter does not cause an interference with another light on the optical transmission path, on the basis of the detection result;

controlling the wavelength of the output light from the self optical transmitter to be a wavelength falling within the unoccupied space; and setting, as a reference side wavelength, a wavelength of another light which is adjacent to the wavelength of the output light from the self optical transmitter on one of the longer and shorter wavelength side along a wavelength axis, and controlling the wavelength of the output light so as to set a wavelength interval between the reference side wavelength and the wavelength of the output light from the self optical transmitter to be close to a predetermined first wavelength interval or to maintain the wavelength interval between the reference side wavelength and the wavelength of the output light from the self optical transmitter to have a value in the neighborhood of the predetermined first wavelength interval.

According to the present invention, an unoccupied space present between wavelength groups in each of which a plurality of wavelengths are assigned at predetermined wavelength intervals can be effectively used.

The present invention also provides, as a wavelength control method, an output light wavelength control method for an optical transmitter which is used in an optical communication system for performing wavelength division multiplex communication on an optical transmission path, characterized by comprising the steps of:

detecting a wavelength of light on the optical transmission path;

setting, as a reference side wavelength, a wavelength of another light which is adjacent to the wavelength of the output light from the self optical transmitter on one of the longer and shorter wavelength side along a wavelength axis, and controlling the wavelength of the output light so as to set a wavelength interval between the reference side wavelength and the wavelength of the output light from the self optical transmitter to be close to a predetermined first wavelength interval or to maintain the wavelength interval between the reference side wavelength and the wavelength of the output light from the self optical transmitter to have a value in the neighborhood of the predetermined first wavelength interval; and controlling to set an opposite side wavelength, which is adjacent to the wavelength of the output light from the self optical transmitter on a side opposite to the reference side wavelength, to be the reference side wavelength, when the wavelength interval between the reference side wavelength and the wavelength of the output light from the self optical transmitter is maintained to have a value in the neighborhood of the predetermined first wavelength interval, and when a wavelength interval between the wavelength of the output light from the self optical transmitter and the opposite side wavelength becomes not more than a predetermined second interval.

According to the present invention, even when wavelength groups in each of which a plurality of wavelengths are assigned at predetermined wavelength intervals are set to be close to each other, communications can be performed without causing any interference.

The above-mentioned two inventions can adopt an arrangement for attaining the wavelength detection by sweeping the detectable wavelength of a wavelength detection means in the transmitter, an arrangement for sweep-detecting a region including the wavelength variable range of the output light of the self optical transmitter upon detection of the wavelength, and an arrangement for controlling a light-emission means of the self optical transmitter to emit light upon sweep detection and to input the output light from the light-emission means to the wavelength detection means, and sweeping the detectable wavelength of the wavelength detection means, thereby detecting the output light wavelength of the light-emission means of the self optical transmitter together with the wavelength of another light on the optical transmission path.

In the above-mentioned two inventions, when the output light of the light-emission means of the self optical transmitter is input to the wavelength detection means without being output onto the optical transmission path so as to detect the wavelength of the output light of the light-emission means of the self optical transmitter together with another wavelength on the optical transmission path, in particular, the wavelength setting operation at the beginning of transmission does not have any influence on light on the optical transmission path. In order to distinguish the light wavelength of the self optical transmitter from the wavelength of another light on the optical transmission path, it is effective to compare the sweep detection result obtained when the light-emission means of the self optical transmitter emits light with the sweep detection result obtained when the light-emission means does not emit any light.

In order to control the light-emission means of the self optical transmitter to emit light at a wavelength in the unoccupied space, it is effective to set the detectable wavelength of the wavelength detection means of the self transmitter in the unoccupied space and to match the output light wavelength of the light-emission means of the self optical transmitter with the detectable wavelength by sweeping the output light wavelength. In this case, an arrangement for setting the detectable wavelength at an end portion of the unoccupied space farther from the reference side wavelength and gradually shifting the wavelength toward the reference side wavelength, or an arrangement for omitting the operation for gradually shifting the wavelength by setting the detectable wavelength at an end portion of the unoccupied space closer to the reference side wavelength is available.

Also, an arrangement for controlling the light-emission means of the self optical transmitter to set the wavelength interval between the wavelength of the output light of the self optical transmitter and the reference side wavelength close to the first wavelength interval or to maintain the wavelength interval to be that in the neighborhood of the first wavelength interval by always detecting the wavelength interval is available. In the present invention, it is effective to directly perform wavelength detection using the wavelength filter. As another wavelength detection means, heterodyne detection using a local light source may be used. However, with the heterodyne detection, the wavelength difference between two wavelengths can be detected, but which of the two wavelengths is longer (or shorter) cannot be detected.

In the above-mentioned invention, the method further comprises the step of detecting the number of wavelengths belonging to each of a plurality of wavelength groups each consisting of a plurality of wavelengths assigned at predetermined wavelength intervals on the optical transmission path. When the wavelength at the end portion of a wavelength group which includes the largest number of wavelengths falling within the wavelength variable range of the output light of the self optical transmitter is set to be the reference side wavelength, the wavelength interval between adjacent wavelength groups formed on the transmission path can be reduced.

The present application also provides an optical transmitter or optical transmitter/receiver to which the above-mentioned wavelength control method can be applied, and an optical communication system using the same.

BRIEF DESCRIPTION OF THE DRAWINGS

FIG. 6 is an explanatory view of the operation of a wavelength control method according to the first embodiment;

FIG. 11 is an explanatory view of the operation of a wavelength control method according to the present invention;

DETAILED DESCRIPTION OF THE PREFERRED EMBODIMENTS

The principle of wavelength control according to the present invention will be described below.

Figure 9:
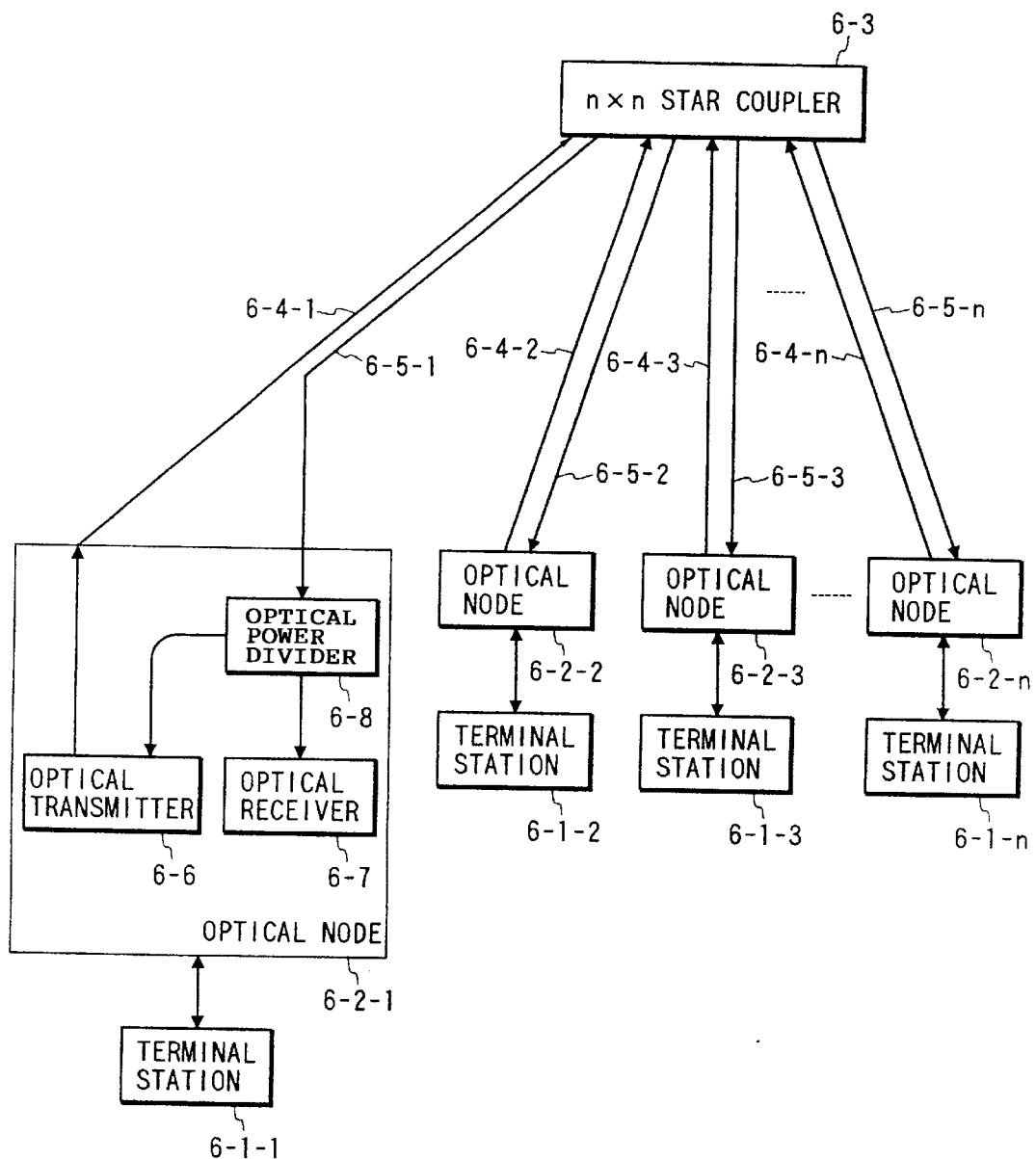
FIG. 9 is a block diagram showing an example of the arrangement of an optical communication system according to the present invention.

FIG. 9 shows an example of the arrangement of an optical communication system, and exemplifies a star network having n terminal stations. As shown in FIG. 9, the network is constituted by terminal stations 6-1-1 to 6-1-n, optical nodes 6-2-1 to 6-2-n, an n×n star coupler 6-3, and optical fibers 6-4-1 to 6-4-n and 6-5-1 to 6-5-n. Each of the optical nodes 6-2-1 to 6-2-n is constituted by an optical transmitter 6-6, an optical receiver 6-7, and an optical power divider 6-8.

The terminal stations 6-1-1 to 6-1-n are connected to the network via the optical nodes 6-2-1 to 6-2-n. The optical nodes 6-2-1 to 6-2-n are connected to the n×n star coupler 6-3 via the transmission optical fibers 6-4-1 to 6-4-n and the reception optical fibers 6-5-1 to 6-5-n. Transmission light from each optical transmitter is sent to the n×n star coupler 6-3 via a corresponding one of the transmission optical fibers 6-4-1 to 6-4-n. The n×n star coupler 6-3 equally distributes the transmission light to the reception optical fibers 6-5-1 to 6-5-n to supply it to the optical nodes 6-2-1 to 6-2-n. Input light from each of the reception optical fibers 6-5-1 to 6-5-n is divided by the optical power divider 6-8 into two light beams, which are respectively input to the optical receiver 6-7 and the optical transmitter 6-6. With this arrangement, transmission light from a self station is input to the optical filter of the self optical transmitter together with transmission light beams from other stations.

Figure 1:
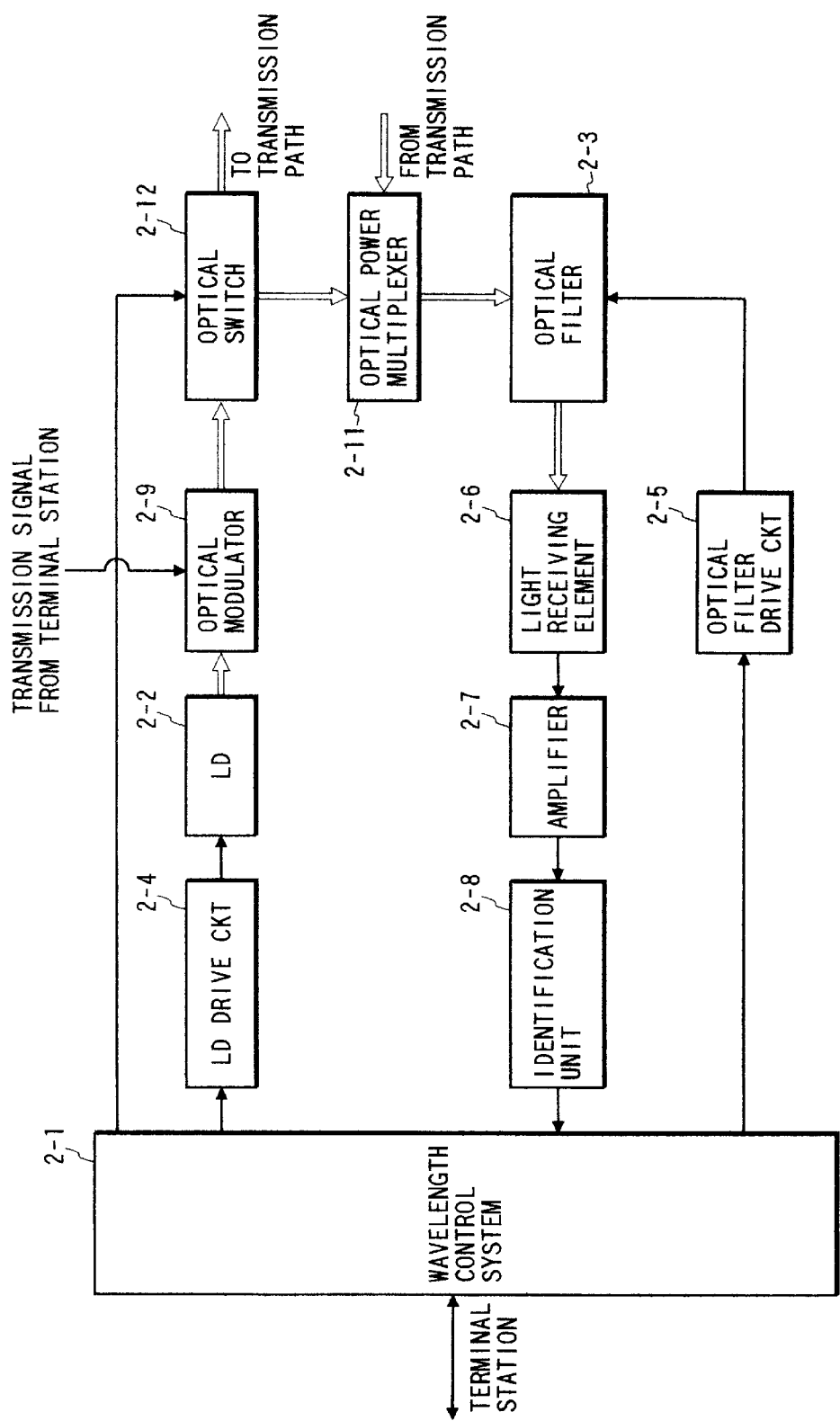
FIG. 1 is a block diagram showing an example of the arrangement of an optical transmitter according to the present invention.

FIG. 1 shows an example of the arrangement of the optical transmitter. As shown in FIG. 1, the optical transmitter is constituted by a wavelength control system 2-1, an LD 2-2, an optical filter 2-3, an LD drive circuit 2-4, an optical filter drive circuit 2-5, a light receiving element 2-6, an amplifier 2-7, an decision circuit 2-8, an optical modulator 2-9, an optical power multiplexer 2-11, and an optical switch 2-12.

The wavelength control system 2-1 controls the LD drive circuit 2-4, the optical filter drive circuit 2-5, and the optical switch 2-12 on the basis of an output signal from the decision circuit 2-8 so as to attain a tuning operation. The control system 2-1 comprises an processing circuit, a memory element, an A/D converter, a D/A converter, and the like, and stores parameters and operation procedures required for the tuning operation. The start timing of the tuning operation is controlled by a terminal station connected to or including the optical transmitter.

The LD 2-2 and the optical filter 2-3 can use the elements described in the prior art. The bandwidth (half-width) of the optical filter 2-3 is assumed to be $\frac{1}{10} \cdot \Delta\lambda$. $\Delta\lambda$ is the interval between adjacent wavelengths, and will be described in detail later. Also, assume that LDs serving as light-emission means in all the transmitters in the system have substantially the same wavelength variable ranges, and the wavelength variable range of the optical filter 2-3 is larger than that of the LD serving as the light-emission means of the transmitter. The optical modulator 2-9 intensity-modulates the output light from the LD with a transmission signal. When a transmission signal is directly modulated with a current supplied to the LD 2-2, the wavelength undesirably varies by about 0.1 nm. In order to prevent this, an external intensity modulation method using an optical modulator is adopted.

The LD drive circuit 2-4 drives (supplies a current to) the LD 2-2 to obtain a wavelength corresponding to an LD control signal (control voltage; Ve) supplied from the wavelength control system. For example, when the above-mentioned three-electrode length resonator $\lambda/4$ shift MQW-DFB laser is used, the circuit 2-4 has three outputs. The following description will be made under the assumption that the change amount of Ve is substantially proportional to that of the wavelength of the LD 2-2. Let $\Delta$Ve be the change amount of Ve corresponding to $\Delta\lambda$. Also, let Vemin be Ve corresponding to the shortest wavelength in the wavelength variable range of the LD 2-2, and Vemax be Ve corresponding to the longest wavelength thereof.

The optical filter drive circuit 2-5 drives the optical filter 2-3 to obtain a wavelength corresponding to an optical filter control signal (control voltage; Vf) supplied from the wavelength control system. Let $\Delta$Vf be the change amount of Vf corresponding to $\Delta\lambda$. Also, let Vfmin be Vf corresponding to the shortest wavelength in the wavelength variable range of the optical filter 2-3 and Vfmax be Vf corresponding to the longest wavelength thereof.

The threshold value of the decision circuit 2-8 is set to be a value half the output from the amplifier 2-7 when the wavelength of each channel input from the transmission path to the optical filter 2-3 matches that of the optical filter 2-3. When the input signal is equal to or higher than the threshold value, the decision circuit 2-8 outputs H; otherwise, the unit 2-8 outputs L (H indicates 1 of a digital signal; L indicates 0 of a digital signal).

The optical power multiplexer 2-11 multiplexes light from the optical switch 2-12 and light from the transmission path, and inputs the multiplexed light to the optical filter 2-3. The optical switch 2-12 outputs light from the optical modulator 2-9 onto the transmission path when an ON/OFF signal is at H; it outputs light to the optical power multiplexer 2-11 when the ON/OFF signal is at L. With this arrangement, the wavelength characteristics with respect to the control voltage Ve for the LD can be detected without outputting any light onto the transmission path.

In the embodiments of the present invention, the light-emission wavelength of the self station, the transmission wavelength of another station, and the wavelength of the optical filter of the self station are associated relative to each other using the control voltages Ve and Vf obtained when the wavelength of the LD (self station or another station) serving as the light-emission means matches the wavelength of the optical filter, thereby controlling the light-emission wavelength of the self station to maintain the predetermined channel interval $\Delta\lambda$. $\Delta$Ve and $\Delta$Vf (serving as references for the sweep range and the channel interval) stored in the wavelength control system 2-1 have an error with respect to $\Delta\lambda$. For this reason, the wavelength sweep range for relatively associating the wavelengths is broadened by $0.2\cdot\Delta\lambda$ at each of its two ends. Also, $\Delta\lambda$ is set to fall within the allowable value range of this error.

The wavelength control (tuning) is performed by the wavelength control system 2-1 on the basis of Ve and Vf, and the output (H or L) from the decision circuit 2-8. Only when the wavelength of the LD of another station or the self station input to the optical filter 2-3 matches the wavelength of the self optical filter, the output from the decision circuit 2-8 changes to H. The wavelength control system 2-1 stores the control voltage (Ve for the LD; Vf for the optical filter) when the output from the decision circuit 2-8 changes to H upon sweeping the wavelength of the LD 2-2 or the optical filter 2-3. In this embodiment, since the passband spectrum bandwidth of the optical filter is $\frac{1}{10}\Delta\lambda$ while the sweep step is set to be about $\frac{1}{40}\Delta\lambda$, control voltages of H may be continuously generated. In this case, the average value of these voltage is calculated, and is recognized as a voltage obtained when the wavelength of the optical filter matches the wavelength of light input to the optical filter.

Figure 2:
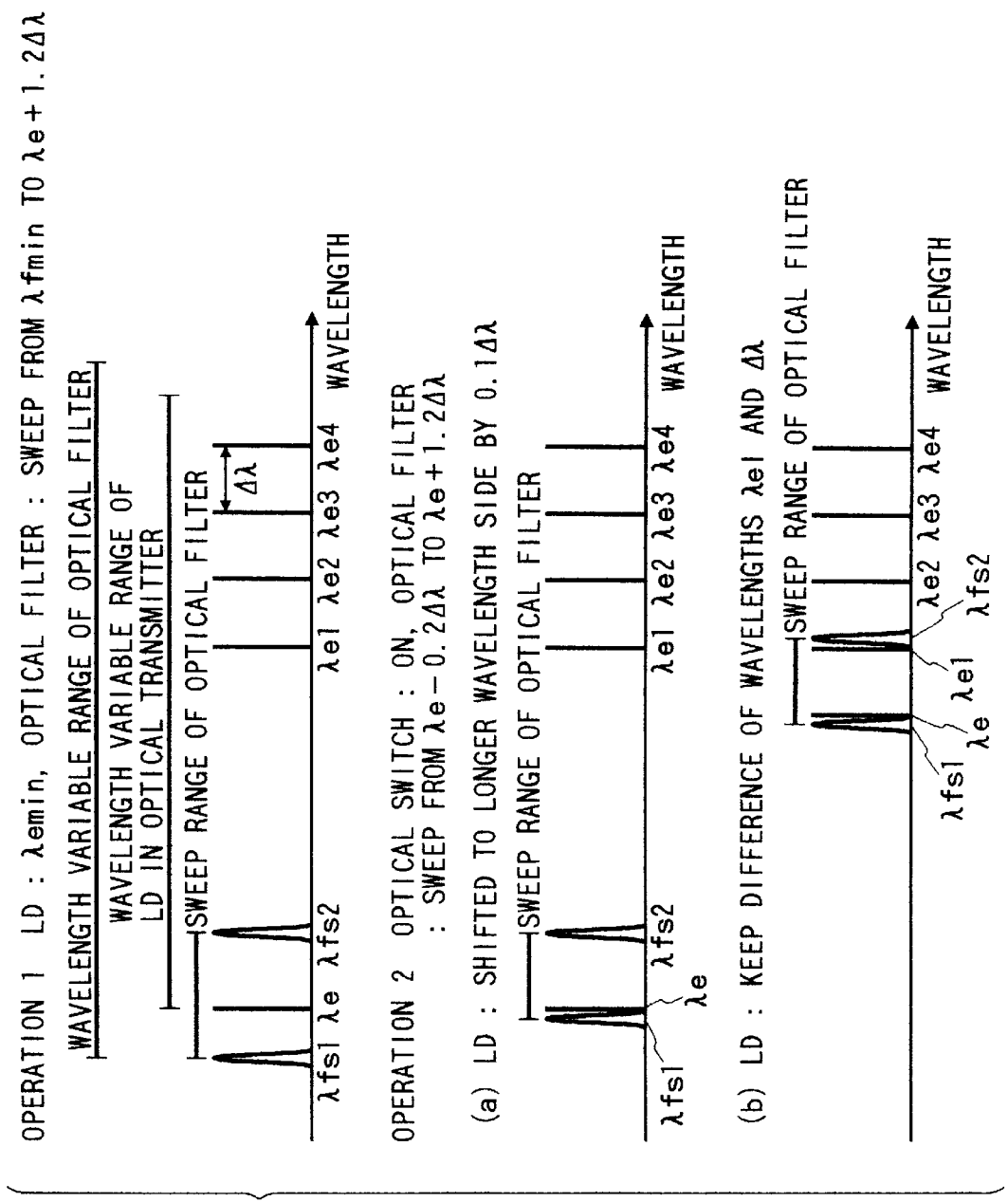
FIG. 2 is an explanatory view of the operation principle of the wavelength control method according to the present invention.

FIG. 2 is an explanatory view of the operation. FIG. 2 includes "operation 1" and "operation 2", and shows the positional relationship between the wavelengths of the LD and optical filter in each operation. The sweep range of the optical filter is shown in the respective operations, and the wavelength variable range of the LD and the wavelength variable range of the optical filter of the optical transmitter are shown in "operation 1". In FIG. 2, $\lambda$en is the transmission wavelength of another optical transmitter in the system, which transmitter is executing transmission when the optical transmitter, whose operations will be described below, starts tuning. $\lambda$e is the wavelength of the LD of the optical transmitter, whose operations will be described below. $\lambda$fs1 is the sweep start wavelength and $\lambda$fs2 is the sweep end wavelength of the optical filter for each sweep. $\Delta\lambda$ is the channel interval.

The tuning operation will be explained below with reference to FIG. 2.

"Operation 1"

Ve is set to be Vemin to oscillate the LD 2-2 at the shortest wavelength, and Vf is swept from Vfmin to Vfe+1.2·$\Delta$Vf. Vf obtained when the output from the decision circuit 2-8 changes to H initially (the wavelength control system 2-1 stores this Vf as Vfe) corresponds to the wavelength of the LD 2-2. When the output from the decision circuit 2-8 changes to H twice or more including the timing of Vfe while Vf is swept from Vfmin to Vfe+1.2·$\Delta$Vf, i.e., when the output temporarily changes from L to H, returns to L, and then changes to H, another light having a wavelength other than the light-emission wavelength of the self station falls within the range of 1.2$\Delta\lambda$ on the wavelength axis, and the absence of an unoccupied space is determined, thus interrupting the tuning operation. When the output from the decision circuit 2-8 does not change to H while Vf is swept from Vfe by 1.2·$\Delta$Vf, since another wavelength is not present within the range of 1.2·$\Delta$Vf from the shortest wavelength of the LD 2-2, it is determined that no interference with another light occurs even when light is output at least within this range, and "operation 2" is performed. Vemin is stored as Vem. Vem serves as a reference value for Ve when the next operation or the next sweep is to be started. Vem is updated as needed for each sweep and is stored in the wavelength control system.

"Operation 2"

Ve=Vem is set and Vf is swept from Vfe−0.2·$\Delta$Vf to Vfe+1.2·$\Delta$Vf. Vf obtained when the output from the decision circuit 2-8 changes to H initially during sweep is stored as Vfm1, and Vf obtained when the output changes to L and then changes to H again is stored as Vfm2 (when the output does not change to H again, Vfm2=Vfm1+1.1·$\Delta$Vf is stored). Then, one of the following calculations is made:

when Vfm2>Vfm1+$\Delta$Vf, Ves=0.05·$\Delta$Ve when Vfm2=Vfm1+$\Delta$Vf, Ves=0 when Vfm2<Vfm1+$\Delta$Vf, Ves=−0.05·$\Delta$Ve and, the value Vem is updated by setting Vem=Vem+Ves Furthermore, Vfe=Vfm1 is set to update the sweep start value of the filter. Then, "operation 2" is repeated. With this operation, $\lambda$e shifts toward the longer wavelength side to maintain the channel interval $\Delta\lambda$ from the neighboring channel ($\lambda$e4 in FIG. 2) on the longer wavelength side within the allowable range. Alternatively, the longest wavelength within the wavelength variable range of the LD 2-2 is maintained. In "operation 2", (a) shows a state at the beginning of shift, and (b) shows a state wherein the shift has ended and $\Delta\lambda$ is maintained. Even when the wavelength of the self station or the neighboring transmission wavelength of another station on the wavelength axis shifts and the channel interval deviates from $\Delta\lambda$, the wavelength of the self station can be shifted by repeating the above-mentioned operation to maintain $\Delta\lambda$. During repetition of this operation, when Vem$\leq$Vemax, the tuning operation is completed, and a state of Ve=Vemax is maintained.

Figure 3:
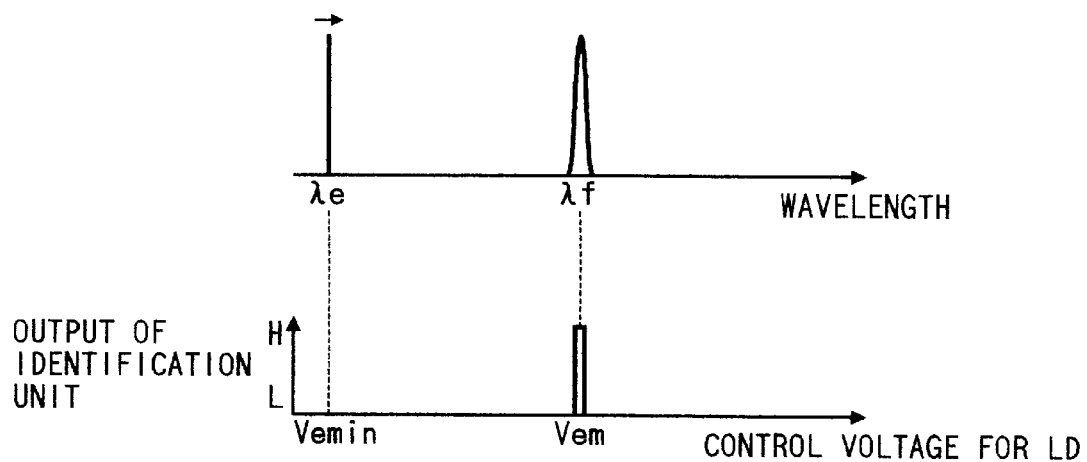
FIG. 3 is a graph showing the relationship between the control voltage for an LD and the output from an decision circuit according to the present invention.

FIG. 3 shows the relationship between the control voltage Ve for the LD and the output from the decision circuit upon wavelength sweeping. The upper graph in FIG. 3 shows the positional relationship of the wavelengths. In FIG. 3, symbols representing the wavelengths are the same as those in FIG. 2. The lower graph in FIG. 3 shows the output from the decision circuit 2-8 with respect to the control voltage for the LD. In FIG. 3, Vemin is a voltage obtained when the LD is set at the shortest wavelength, and Vem is a voltage obtained when the wavelength $\lambda$e of the LD matches the wavelength $\lambda$f of the optical filter. In this embodiment, the sweep step of Ve is set to be 1/20·$\Delta$Ve, as described above.

In the embodiment of the present invention, the optical transmitter starts tuning by checking if light at the shortest wavelength of the wavelength variable range of the self optical transmitter can be output at the shorter wavelength side of the wavelength variable range of the internal LD, and then shifts the wavelength toward the longer wavelength side. In order to check if light at the shorter wavelength of the LD can be output, it is desirable to determine the relative positional relationship between the wavelengths of the LD and those on the transmission path. When the relationship between the control of the wavelength of the LD and the actual wavelength is determined, the wavelength of the self transmitter need not always be detected and checked. However, this relationship may change. When an optical signal is output onto the optical transmission path before this positional relationship is determined, an interference with another light on the transmission path may occur. For this reason, in the embodiment of the present invention, this operation is performed by shielding the output onto the transmission path by the optical switch 2-11.

The tuning operation of the LD in the optical transmitter as the characteristic feature of the present invention has been described. An example of transmission/reception using the above-mentioned method will be described below.

Transmission of communication data is started a predetermined wait time after the optical switch begins to output light onto the optical switch since "operation 1". Before starting the transmission, an idling signal is transmitted. This is to wait for a time required for matching the wavelength of the optical filter in the optical receiver at the receiving side with this channel, and identifying the destination address. The destination address is appended to the idling signal and is used for identifying the reception channel at the receiving side.

Reception is performed by passing $\lambda e$ by the optical filter in the optical receiver (the bandwidth of the passband spectrum of the optical filter in the receiver is assumed to be $\frac{1}{5} \cdot \Delta \lambda$). The optical receiver sequentially matches the wavelength of its optical filter with the wavelength of each light present on the transmission path, and checks the presence/absence of a destination address and if the signal is addressed to the self terminal. If the address is that of the self station, the optical receiver locks the wavelength of its optical filter at that of the light and starts reception. As the locking method, control for modulating the wavelength of the optical filter with a modulated signal of a sine wave (frequency: up to 10 kHz) (maximum wavelength deviation: up to $\frac{1}{40} \cdot \Delta \lambda$) and using the low-frequency component of a product signal of the reception signal and the modulated signal as an error signal may be applied.

In the present invention, the transmission wavelength shifts, as has been described in the description of the operation, and the receiving side must follow this shift. For this purpose, the shift amount (the wavelength change amount corresponding to the value Ves in the description of the operation) in one step upon transmission wavelength shift is set to be $\frac{1}{20} \cdot \Delta \lambda$, and the bandwidth of the optical filter in the receiver is set to be $\frac{1}{5} \cdot \Delta \lambda$, so that the receiving side can sufficiently follow the shift.

In this description, each transmitter in the system shifts the self transmission wavelength from the shorter wavelength side toward the longer wavelength side. Since this shift operation is performed as needed, when the neighboring transmission wavelength of another station on the longer wavelength side disappears (the other station quits transmission) or when the neighboring wavelength further shifts toward the longer wavelength side, the transmission wavelength of the self station can be packed to the longer wavelength side, thus effectively using the wavelength range in the system. In this example, the transmission wavelength is packed to the longer wavelength side but may be crammed to the shorter wavelength side.

Figure 4:
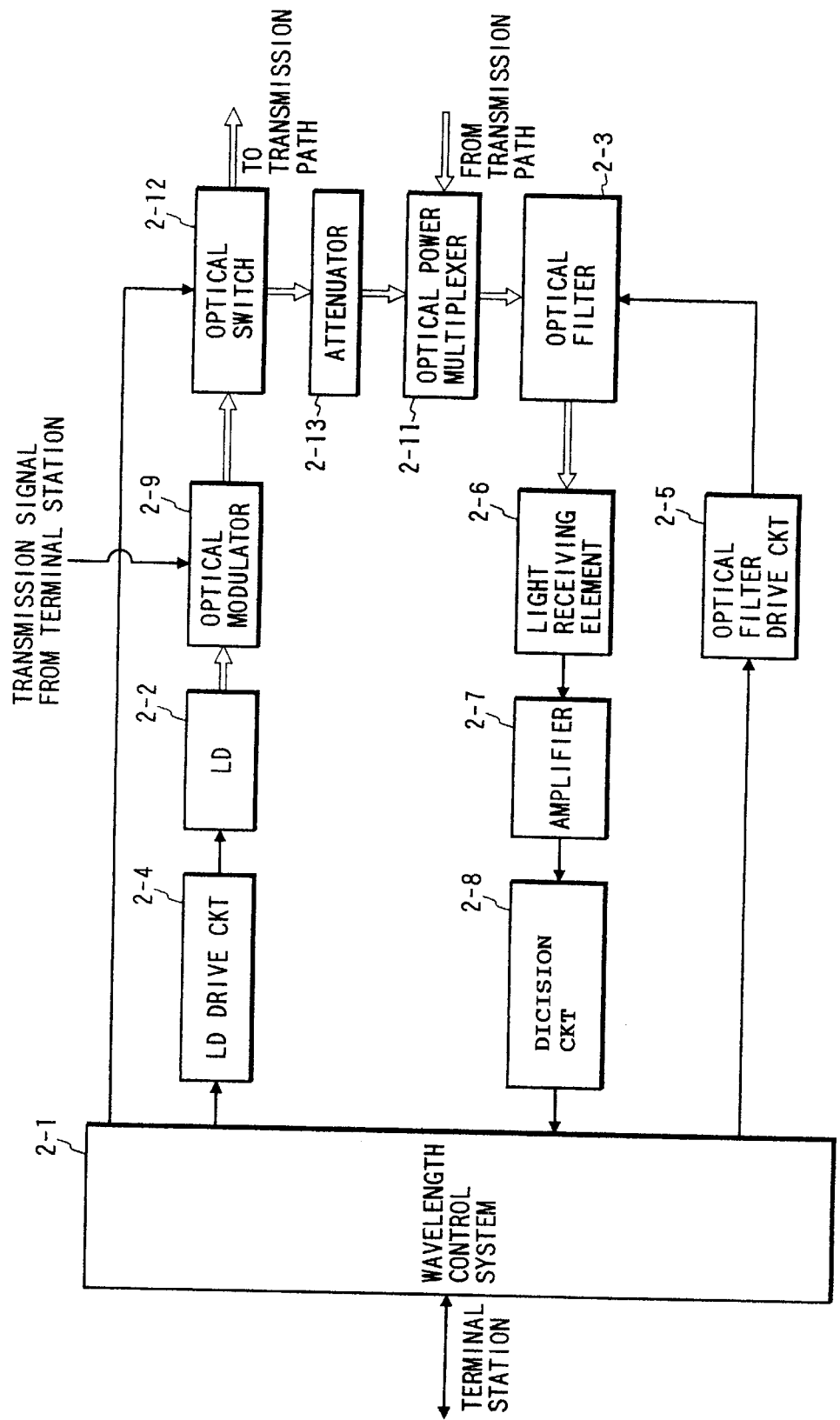
FIG. 4 is a block diagram showing another arrangement of the optical transmitter of the present invention.

When a signal is not amplified or is not sufficiently amplified by, e.g., the star coupler during transmission in the network, the intensity difference between light input from the transmission path to the optical power multiplexer and light input from the optical switch to the optical power multiplexer poses a problem in terms of detection. At this time, an attenuator 2-13 may be inserted between the optical switch and the optical power multiplexer, as shown in FIG. 4, or the optical switch may attenuate light when it outputs the light to the optical power multiplexer.

Figure 5:
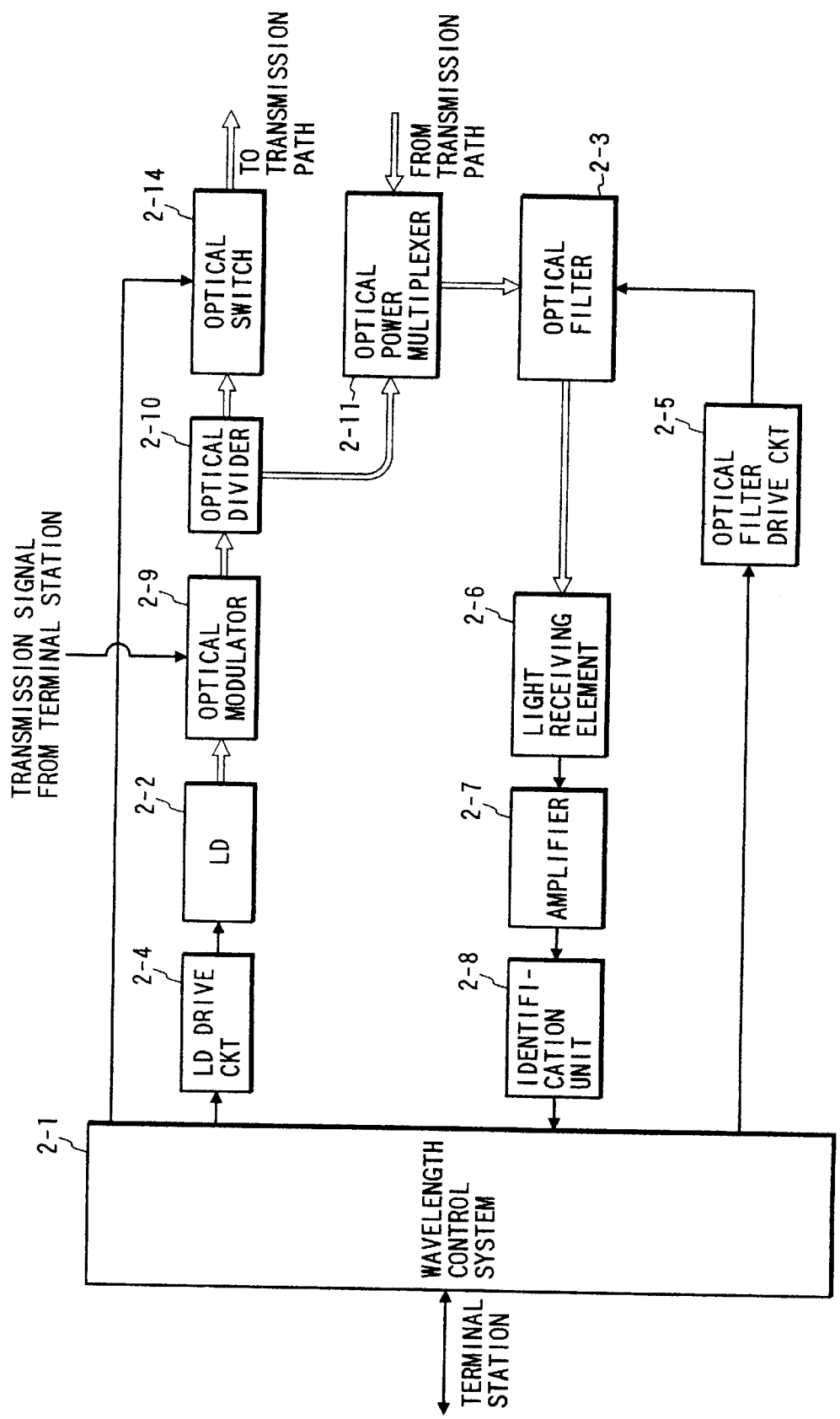
FIG. 5 is a block diagram showing another arrangement of the optical transmitter of the present invention.

As shown in FIG. 5, as the optical switch, a switch for selecting only whether or not the light is output may be used, and the same operation as in FIG. 1 may be attained in combination with an optical power divider 2-10. In the arrangement shown in FIG. 1, the optical switch serves as both a means for selecting whether or not light is output onto the transmission path, and a means for inputting light output from the LD to the optical power multiplexer, the optical filter, and the like. However, in the arrangement shown in FIG. 5, the same switch operation is attained using an optical switch and an optical power divider. With this arrangement, even in a network with an arrangement in which the transmission wavelength of a self station output onto the optical transmission path does not return to the self station, the wavelength of the output light of the self station can be detected. Also, in this arrangement, since light divided from the optical power divider 2-10 toward the optical power multiplexer side and light output from the optical power multiplexer onto the optical transmission path via the optical switch are multiplexed with light input from the optical transmission path, the intensity difference between light of the wavelength of the self station and another light may pose a problem. In view of this problem, the dividing ratio of the optical power divider 2-10 or the gain on the network may be appropriately controlled, so that the light intensity difference falls within a detectable range.

In the above example, the relative positional relationship between the light-emission wavelength of the self station and the wavelength of another light on the optical transmission path along the wavelength axis is detected. That is, in the present invention, the absolute wavelength of light output from the self station or another station need not be recognized. Also, a relative relationship among the wavelength of the light-emission means, the wavelength of the filter, and their control signals need only be recognized. For example, an absolute relationship (e.g., light is emitted at 1556.000 nm upon application of a control voltage of 1 V) need not be recognized.

The present invention relates to wavelength control which can effectively use the available wavelength range at a high density using the above-mentioned wavelength control principle even when the respective terminal stations have different outputtable wavelength variable ranges. The embodiments of the present invention will be described in detail below.

(First Embodiment)

This embodiment uses the arrangement of the optical communication system shown in FIG. 9.

Also, the arrangement of an optical transmission in this embodiment is the same as that shown in FIG. 1 as in the description of the principle. In this embodiment, assume that the wavelength variable range of the optical filter 2-3 is larger than those of the LDs serving as the light-emission means of all the transmitters in the system.

FIG. 6 is an explanatory view of the operation of this embodiment. FIG. 6 includes "operation 1" to "operation 4", and shows the positional relationship between the wavelengths of the LD and the optical filter in the respective operations. The sweep range of the optical filter is shown in the respective operations, and the wavelength variable range of the LD of the optical transmitter whose operations will be described below is shown in "operation 1". In FIG. 6, λen (n=1 to 6) is the wavelength of another optical transmitter in the system, which transmitter is performing transmission when the optical transmitter whose operations will be described below starts tuning. λe is the wavelength of the LD of the optical transmitter, whose operations will be described below. The wavelengths λe1 to λe4, and the wavelengths λe5 and λe6 are assigned at the intervals Δλ (channel intervals). Let λfs1 be the sweep start wavelength of the optical filter, and λfs2 be the end wavelength thereof. Also, let λes1 be the sweep start wavelength of the LD, and λes2 be the end wavelength thereof.

Figure 7:
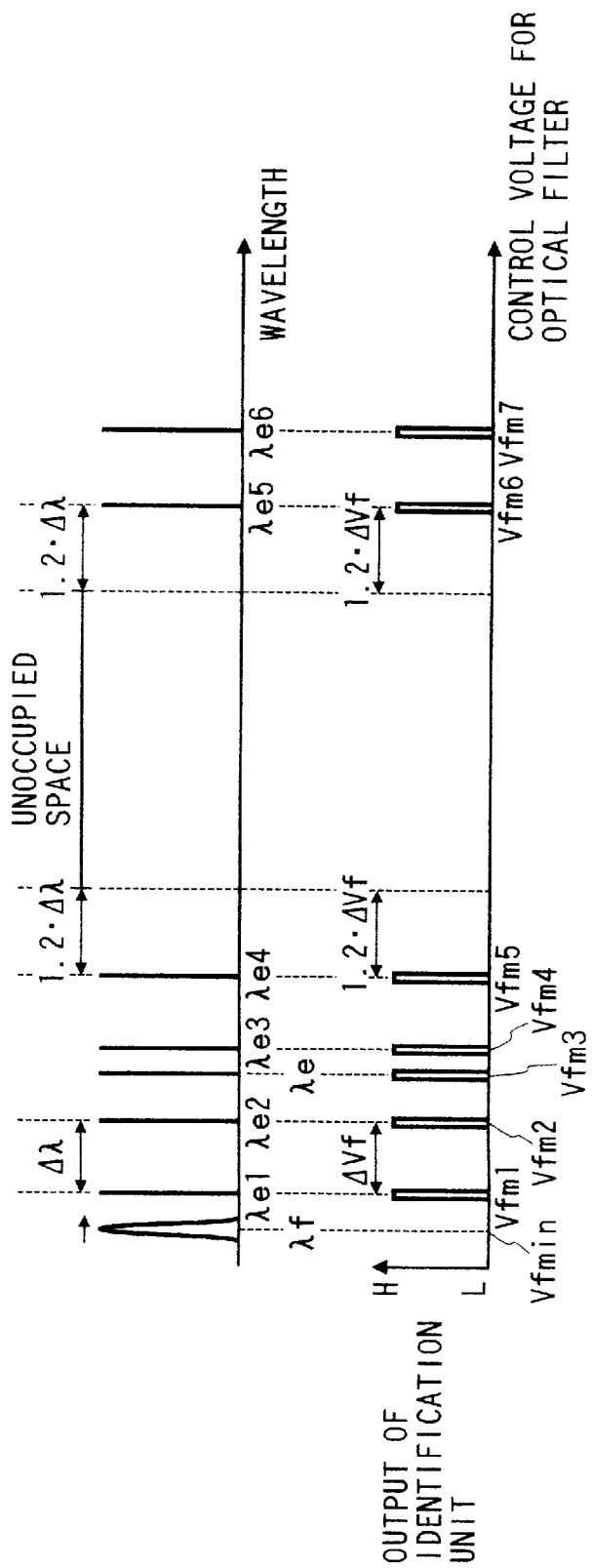
FIG. 7 is a graph showing the relationship between the control voltage for an LD and the output from an decision circuit according to the first embodiment.

FIG. 7 shows the relationship between the control voltage Vf for the optical filter and the output from the decision circuit upon sweeping the wavelength of the optical filter. FIG. 7 also shows an unoccupied space to which the LD of the optical transmitter is to be tuned in this embodiment. In this embodiment, the unoccupied space means a region which includes no light within the wavelength range of 1.2·Δλ or more on both the shorter and longer wavelength sides of the space (e.g., a region from λe4+1.2Δ to λe5−1.2Δλ). More specifically, if there is no transmission light from another station across 2.4·Δλ, an unoccupied space is present. In practice, if no other light is present across Δλ or more on both the shorter and longer wavelength sides, i.e., across 2·Δλ or more, an unoccupied space is present. However, since wavelength detection is performed to include some margin, 2.4·Δλ is set. Of course, this margin value is determined as needed. When the wavelength of the LD is set in an unoccupied space, it is guaranteed that no interference with another light occurs. FIG. 7 shows the assignment of the wavelengths of transmitters which are performing transmission in the optical communication system. Symbols indicating the wavelengths in FIG. 7 are the same as those in FIG. 6. The lower graph shows the output from the decision circuit 2-8 with respect to the control voltage for the optical filter. In FIG. 7, Vfmin is a voltage obtained when the optical filter is set at the shortest wavelength, and Vfm1, Vfm2, . . . , Vfm7 are voltages obtained when the wavelength of the optical filter matches λen (n=1 to 4), λe, and λen (n =5 and 6), respectively. Also, ΔVf is the change amount of Vf when the wavelength of the optical filter changes by Δλ. The sweep step of Vf is set to be ¹⁄₄₀·ΔVf, as described above.

The relationship between the control voltage Ve for the LD and the output from the decision circuit upon sweeping the wavelength of the LD is as shown in FIG. 3.

Figure 8:
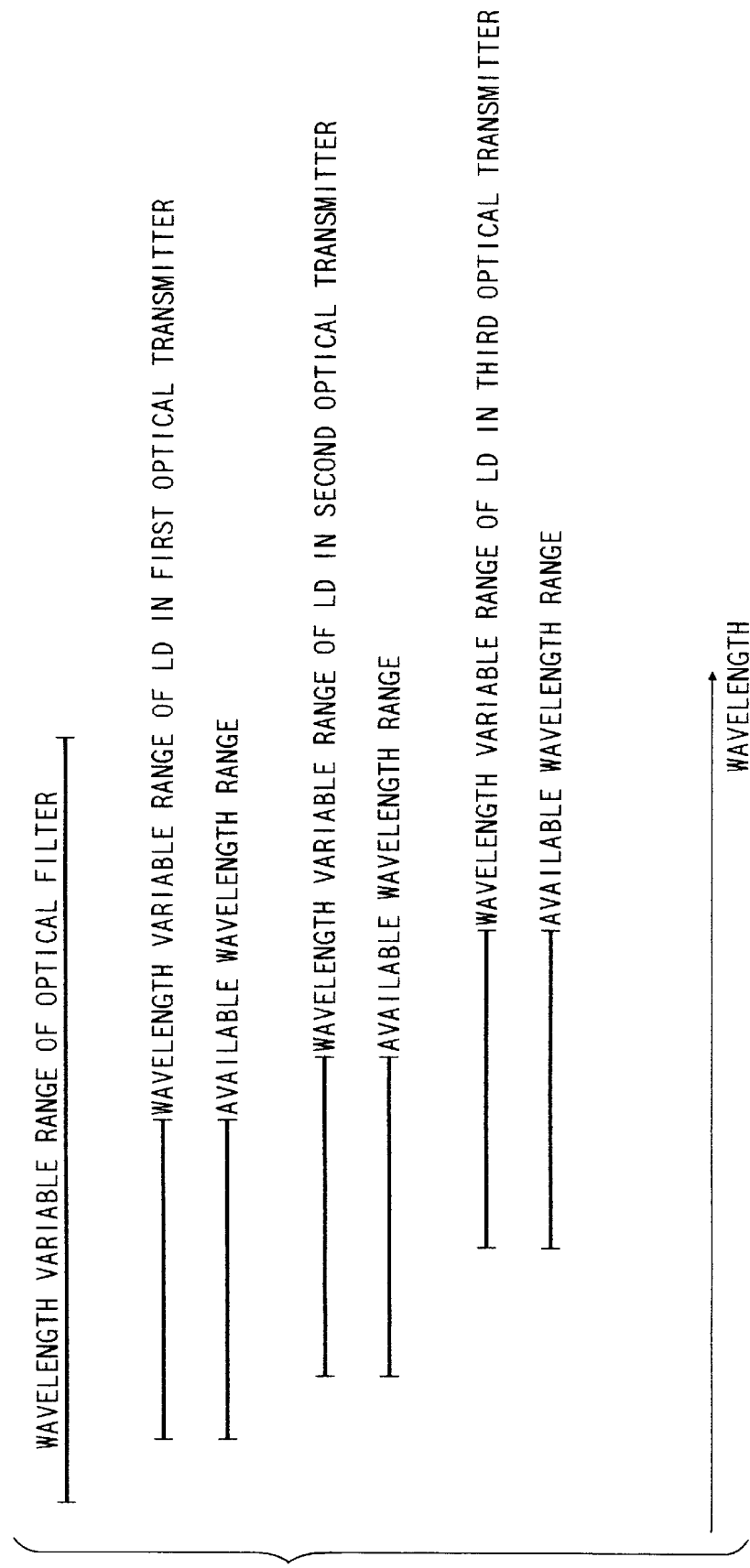
FIG. 8 is a chart showing the wavelength variable ranges and available wavelength ranges of the LDs in the respective optical transmitters in a system of the first embodiment.

FIG. 8 shows an example of the relationship between the wavelength variable ranges and the available wavelength ranges of the LDs of three terminal stations.

In this embodiment, even when an unoccupied space is not present at the shortest wavelength side of the self optical transmitter, an unoccupied space may be present at the longer wavelength side. For this reason, the optical transmitter searches for an unoccupied space within the entire wavelength variable range of the internal LD, starts tuning at the shorter wavelength side of the found unoccupied space, and gradually shifts the wavelength toward the longer wavelength side. In this embodiment as well, in order to search for an unoccupied space within the wavelength variable range of an LD, the relative positional relationship between the wavelength of the LD and those on the transmission path must be checked. When an optical signal is output onto the optical transmission path before this positional relationship is determined, an interference with another light on the transmission path may occur. For this reason, this operation is performed by shielding the output onto the transmission path by the optical switch 2-12.

The tuning operation is performed by the wavelength control system 2-1. The overall tuning operation will be described below with reference to FIG. 6.

"Operation 1" Search for Unoccupied Space (Part 1)

The optical switch 2-12 is set in the OFF state so as not to output the wavelength onto the optical transmission path. Thereafter, the LD 2-2 is oscillated at the shortest wavelength, and the wavelength of the optical filter is swept from λfmin to λfmax. Vf obtained when the output from the decision circuit 2-8 changes to H is stored as Vfm1, Vfm2, . . . . More specifically, in order to oscillate the LD 2-2 at the shortest wavelength, Ve is fixed to be Vemin, and in order to sweep the wavelength of the optical filter from λfmin to λfmax, Vf is swept from Vfmin to Vfmax. In this example, Vfm1-1, Vfm1-2, . . . , Vfm1-7 are stored. "Operation 2" Search for Unoccupied Space (Part 2)

The optical switch 2-12 is kept in the OFF state. The LD 2-2 is set in the OFF state (to turn off light), and the wavelength of the optical filter 2-3 is swept in the same range as in "operation 1". Vf obtained when the output from the decision circuit 2-8 changes to H is stored as Vfm2-1, Vfm2-2, . . . . More specifically, in order to set the LD 2-2 in the OFF state (to turn off light), Ve is fixed to be 0, and in order to sweep the wavelength of the optical filter, Vf is swept from Vfmin to Vfmax. In this operation, Vfm2-1, Vfm2-2, . . . , Vfm2-6 are stored. At this time, since the LD of the self station does not emit light, the number of values Vf to be stored is smaller by at least 1 than that in "operation 1". At this time, of Vfm1-1, Vfm1-2, . . . , Vfm1-7 stored in "operation 1", the wavelength which is none of Vfm2-1, Vfm2-2, . . . , Vfm2-6 stored in "operation 2" corresponds to the wavelength of the LD 2-2 as the light-emission means of the self station. At this time, if the number of values Vf decreases by two or more as compared to that in "operation 1", it is considered that there is another station which has quitted transmission. In this case, the LD 2-2 emits light at the shortest wavelength again, the wavelength of the optical filter is swept in the same range, and the newly detected value Vf is recognized as the wavelength of the LD of the self station. This value is stored as Vfemin. Of wavelengths Vfm2-1, Vfm2-2, . . . on the wavelength axis equal to or higher than Vfemin, a combination, on the shortest wavelength side, of neighboring wavelengths which have a difference of 2.4·Δλ or more therebetween is selected (in this case, a combination of Vfm5 and Vfm6), and the interval between these wavelengths is recognized as the unoccupied space. Note that the sweep operation of the optical filter for finding out an unoccupied space may be stopped when an unoccupied space is found. In this embodiment, the sweep operation of the optical filter for finding out an unoccupied space is performed for the entire sweep region of the optical filter but may be performed within the range of the light-emission wavelengths of the light-emission means of the self transmitter.

"Operation 3" (Shift Wavelength of LD 2-2 to Shorter Wavelength Side of Unoccupied Space)

While the optical switch 2-12 is kept in the OFF state, the wavelength of the optical filter 2-3 is fixed at the shorter wavelength side of the unoccupied space, and the wavelength of the LD 2-2 is swept from λemin until the output from the decision circuit 2-8 changes to H. Ve obtained when the output from the decision circuit 2-8 changes to H is stored as Vem. The unoccupied space in this description falls within the range from λe4+1.2Δλ to λe5−1.2Δλ. In order to fix the wavelength of the optical filter 2-3 at the shorter wavelength side of the unoccupied space, Vf=Vfe=Vfm5+1.2·ΔVf is fixed (in this case, Vfm5 corresponds to λe4), and Ve is swept from Vemin. By sweeping Ve from Vemin, the output from the decision circuit 2-8 changes to H when the wavelength of the LD 2-2 matches the wavelength of the optical filter 2-3, and Ve at that time is stored as Vem. When Vem≧Vemax holds during sweeping the wavelength of the LD 2-2, it is determined that no unoccupied space is present within the wavelength variable range of the LD 2-2, and the tuning operation is interrupted.

"Operation 4" (Shift, Keep Δλ)

In order to cause the LD 2-2 to emit light at the wavelength at the shorter wavelength side in the unoccupied space, Ve is set to be Vem. Thus, since the wavelength of the LD 2-2 can be set within the unoccupied space, the optical switch 2-12 can be turned on from this time to output the output light from the LD 2-2 onto the optical transmission path. Furthermore, as the next process, in order to sweep the wavelength of the optical filter 2-3 from the shorter wavelength side of the unoccupied space by the interval for one channel with a margin, Vf is swept from Vfe −0.2·ΔVf to Vfe+1.2·ΔVf. Vf obtained when the output from the decision circuit 2-8 changes to H initially during the sweep operation is stored as Vfm1, and Vf obtained when the output temporarily changes to L thereafter and changes to H again is stored as Vfm2 (when the output does not change to H again, Vfm2=Vfm1+1.1·ΔVf is set). The wavelength corresponding to Vfm1 is the transmission wavelength of the self station, and the wavelength corresponding to Vfm2 is the neighboring transmission wavelength of another station on the longer wavelength side on the wavelength axis. Then, one of the following calculations is made:

when Vfm2>Vfm1+ΔVf, Ves=0.05·ΔVe when Vfm2=Vfm1+ΔVf, Ves=0 when Vfm2<Vfm1+ΔVf, Ves=−0.05·ΔVe and, the value Vem is updated by setting

Vem=Vem+Ves

Furthermore, the sweep start value of the filter is updated by setting:

Vfe=Vfm1

Thereafter, "operation 4" is repeated. With this operation, λe shifts toward the longer wavelength side, and the channel interval Δλ from the neighboring channel (λe5 in FIG. 6) on the longer wavelength side is maintained within the allowable range. In "operation 4", (a) shows a state at the beginning of shift, and (b) shows a state wherein the shift ends and Δλ is maintained. During repetition of this operation, when Vem>Vemax holds, the state of Ve=Vemax is maintained. In this embodiment, even when Vem≧Vemax holds and the state of Ve=Vemax is maintained, the neighboring wavelength of another light set on the longer wavelength side must be detected. For this reason, as a wavelength detection means in each optical transmitter in the network, a means which can detect the wavelength up to a wavelength higher by the interval for one channel than the maximum light-emission wavelength of the light-emission means of each station or up to a wavelength higher by the sum of the interval for one channel and a margin for an error than the maximum light-emission wavelength is used. The wavelength detection means of the respective optical transmitters in the network may have different detectable wavelength ranges. In this case, each station uses the wavelength detection means which has a detectable wavelength range including the wavelength variable range of the light-emission means of the self station and can detect a wavelength up to a wavelength higher by the interval for one channel or the sum of the interval for one channel and a margin for an error on the side to which the wavelength shifts (the longer wavelength side in this embodiment).

The tuning operation of the LD of the optical transmitter as one characteristic feature of the present invention has been described. An example of transmission/reception using the above-mentioned method will be described below.

Transmission of communication data is started a predetermined wait time after optical switch begins to output light onto the optical switch since the wavelength of the LD is set in the unoccupied space in "operation 3" in FIG. 6. Before starting the transmission, an idling signal is transmitted. This is to wait for a time required for matching the wavelength of the optical filter in the optical receiver at the receiving side with this channel, and identifying the destination address. The destination address is appended to the idling signal and is used for identifying the reception channel at the receiving side.

Reception is performed by passing λe by the optical filter in the optical receiver (the bandwidth of the passband spectrum of the optical filter in the receiver is assumed to be ⅕·Δλ). The optical receiver sequentially matches the wavelength of its optical filter with the wavelength of each light present on the transmission path, and checks the presence/absence of a destination address and if the signal is addressed to the self terminal. If the address is that of the self station, the optical receiver locks the wavelength of its optical filter at that of the light and starts reception. In the present invention, the transmission wavelength shifts, as has been described in the description of the operation, and the receiving side must follow this shift. For this purpose, the shift amount (Ves in the description of the operation) upon shifting the transmission wavelength is set to be an amount that can be followed by the receiving side.

In this embodiment, each transmitter in the system shifts the self transmission wavelength from the shorter wavelength side toward the longer wavelength side. Since this shift operation is performed as needed, when the neighboring transmission wavelength of another station on the longer wavelength side disappears (the other station quits transmission) or when the neighboring wavelength further shifts toward the longer wavelength side, the transmission wavelength of the self station can be packed to the longer wavelength side, thus effectively using the wavelength range in the system. Even when a plurality of unoccupied spaces are intermittently present, since oscillation at the self transmission wavelength is started in the unoccupied space at the shortest wavelength side, the time required for the tuning operation can be shortened. In this embodiment, the transmission wavelength is packed to the longer wavelength side but may be done so to the shorter wavelength side.

When the wavelength variable ranges of the LDs and the optical filters have variations depending on elements, the wavelength range that can be used by the system is limited as follows.

Figure 10:
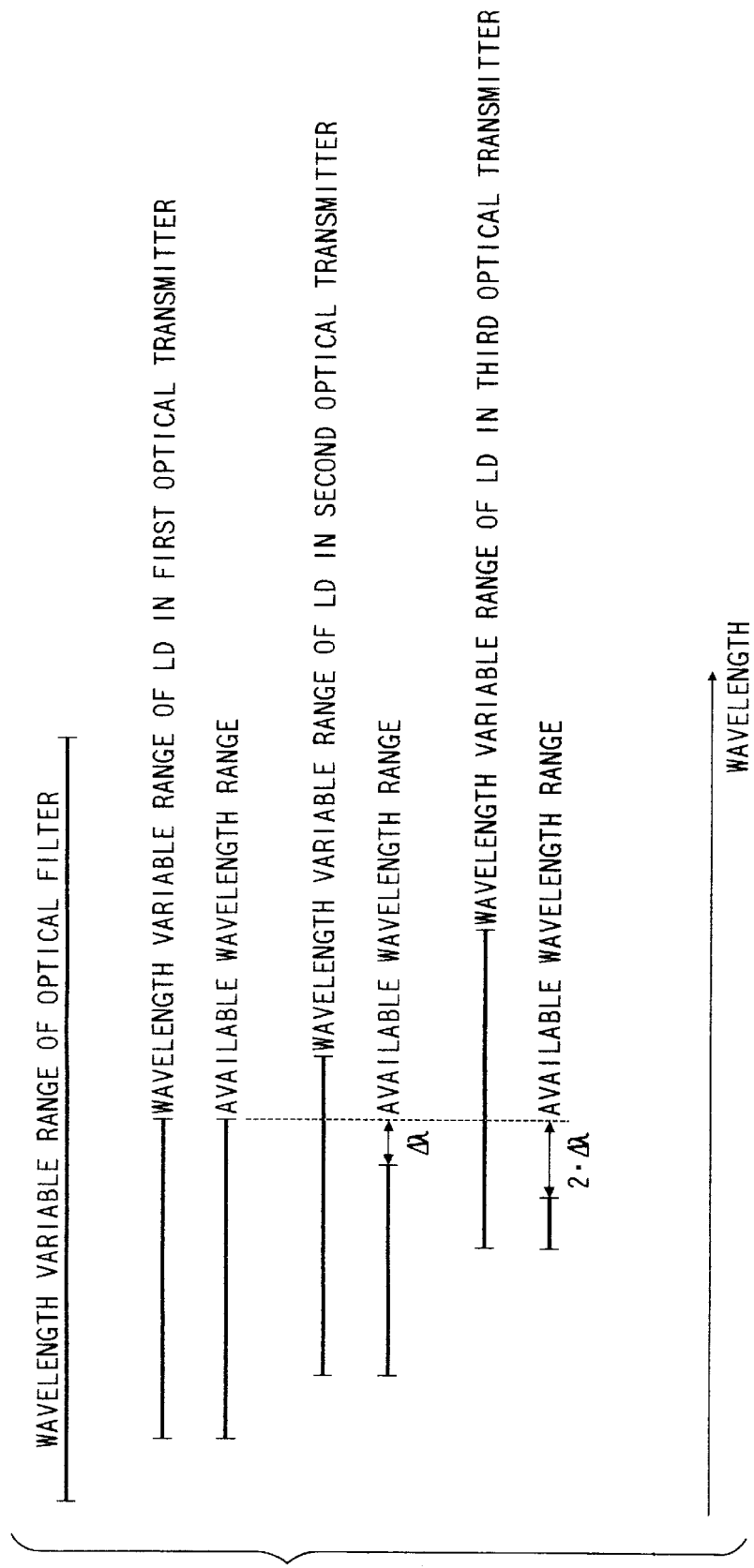
FIG. 10 is a chart showing the available wavelength ranges when the LDs of the respective optical transmitters in a system do not have the same wavelength variable range and the present invention is not applied.

In the above-mentioned example, the LD poses a problem (since the wavelength variable range of the optical filter includes those of the LDs in the system). For example, a case will be explained below wherein the wavelength variable ranges and the available wavelength ranges of the LDs are as shown in FIG. 10, and the number of terminal stations is three. Optical transmitters of these stations will be referred to as the first, second, and third optical transmitters in the start order of transmission. Assume that the wavelength variable range of the LD of the first optical transmitter is present at the shortest wavelength side, and the wavelength variable range of the LD of the third optical transmitter is present at the longest wavelength side. Light output from the first optical transmitter stops wavelength shift at the longest wavelength $\lambda$o of the internal LD. The second optical transmitter has an available wavelength range only on the shorter wavelength side of $\lambda$o–$\Delta\lambda$, and the third optical transmitter has an available wavelength range only on the shorter wavelength side of $\lambda$o–2·$\Delta\lambda$. Therefore, each of the optical transmitters other than the optical transmitter which has begun transmission first can use only a portion of the wavelength variable range of the internal LD. In the worst case, even when an unoccupied space is present within the wavelength variable range, transmission may not be possible. However, in this embodiment, since an unoccupied space can be effectively searched for, the wavelength range of each optical transmitter can be effectively used.

(Second Embodiment)

The second embodiment of the present invention will be described in detail below with reference to the accompanying drawings. Since only a portion of the tuning operation of the second embodiment is different from that in the first embodiment, only this portion will be explained below.

FIG. 11 is an explanatory view of the operation of this embodiment. FIG. 11 includes "operation 1" to "operation 4", and shows the positional relationship between the wavelengths of the LD and the optical filter in the respective operations. Only "operation 3" is different from that shown in FIG. 1. Since the wavelength of the LD shifts at once to a position separated by $\Delta\lambda$ on the shorter wavelength side of the neighboring channel on the longer wavelength side in "operation 3", "operation 4" (a) in FIG. 6 does not exist in this embodiment.

"Operation 1" and "operation 2" are the same as those in the first embodiment.

"Operation 3" (Shift Wavelength of LD 2-2 to Position on Longer Wavelength Side of Unoccupied Space)

While the optical switch 2-12 is kept in the OFF state, the wavelength of the optical filter 2-3 is fixed at the longer wavelength side of an unoccupied space, and the wavelength of the LD 2-2 is swept from $\lambda$emin until the output from the decision circuit 2-8 changes to H. Ve obtained when the output from the decision circuit 2-8 changes to H is stored as Vem. More specifically, in order to fix the wavelength of the optical filter 2-3 at the longer wavelength side of the unoccupied space, Vf=Vfm6·1.2$\Delta$Vf is set and Ve is swept from Vemin. In this case, if Vem$\geq$Vemax holds during sweeping of the wavelength of the LD 2-2, Vf is decreased while maintaining Ve=Vemax, and Vf obtained when the output from the decision circuit 2-8 changes to H is stored as Vfe. When Vfe falls within the unoccupied space (in this case, Vfm5+1.2$\Delta$Vfe$\leq$Vfm6–1.2$\Delta$Vf), no interference with another light on the optical transmission path occurs if Ve=Vemax. For this reason, Vem=Vemax is set. On the other hand, when Vfe does not fall within the unoccupied space, the tuning operation is interrupted.

"Operation 4"

The operation itself is the same as that in the first embodiment. Since the wavelength of the LD shifts at once to a position separated by $\Delta\lambda$ on the shorter wavelength side of the neighboring channel on the longer wavelength side in "operation 3", the wavelength shifts by a small amount toward the longer wavelength side in "operation 4", and $\Delta\lambda$ is maintained mainly.

(Third Embodiment)

Figure 12:
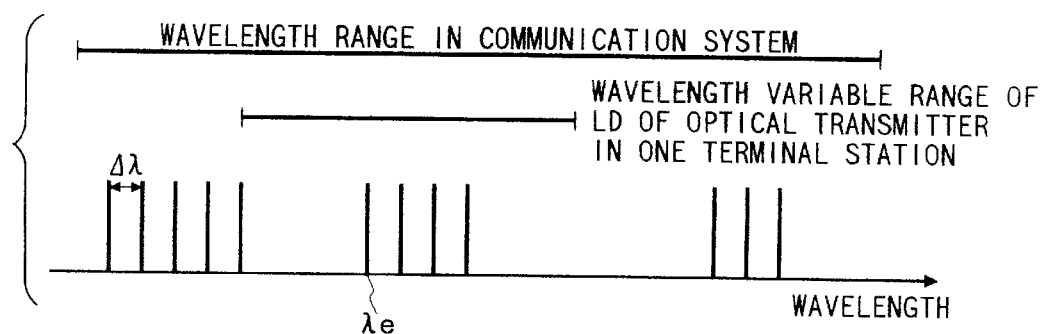
FIG. 12 is a wavelength assignment chart of a wavelength control method according to the third embodiment.

The third embodiment of the present invention will be described below with reference to the accompanying drawings. FIG. 12 shows the wavelength assignment according to the wavelength control method of this embodiment. The wavelength is plotted along the abscissa, and the wavelengths of optical transmitters of the respective terminal stations (to be simply referred to as the "LDs of terminal stations" hereinafter) are indicated by vertical lines. In this embodiment, the wavelengths of the LDs of the terminal stations form some groups separated by intervals $\Delta\lambda$ within the wavelength range of the communication system. The wavelength of the LD of each terminal station belongs to a predetermined group falling within the wavelength variable range of the LD. FIG. 12 shows three groups, and illustrates a state wherein the wavelength, $\lambda$e, of the LD of the terminal station whose wavelength variable range is shown belongs to the central group.

In this embodiment as well, the arrangement of the optical transmitter is the same as that in the above embodiment.

Figure 13:
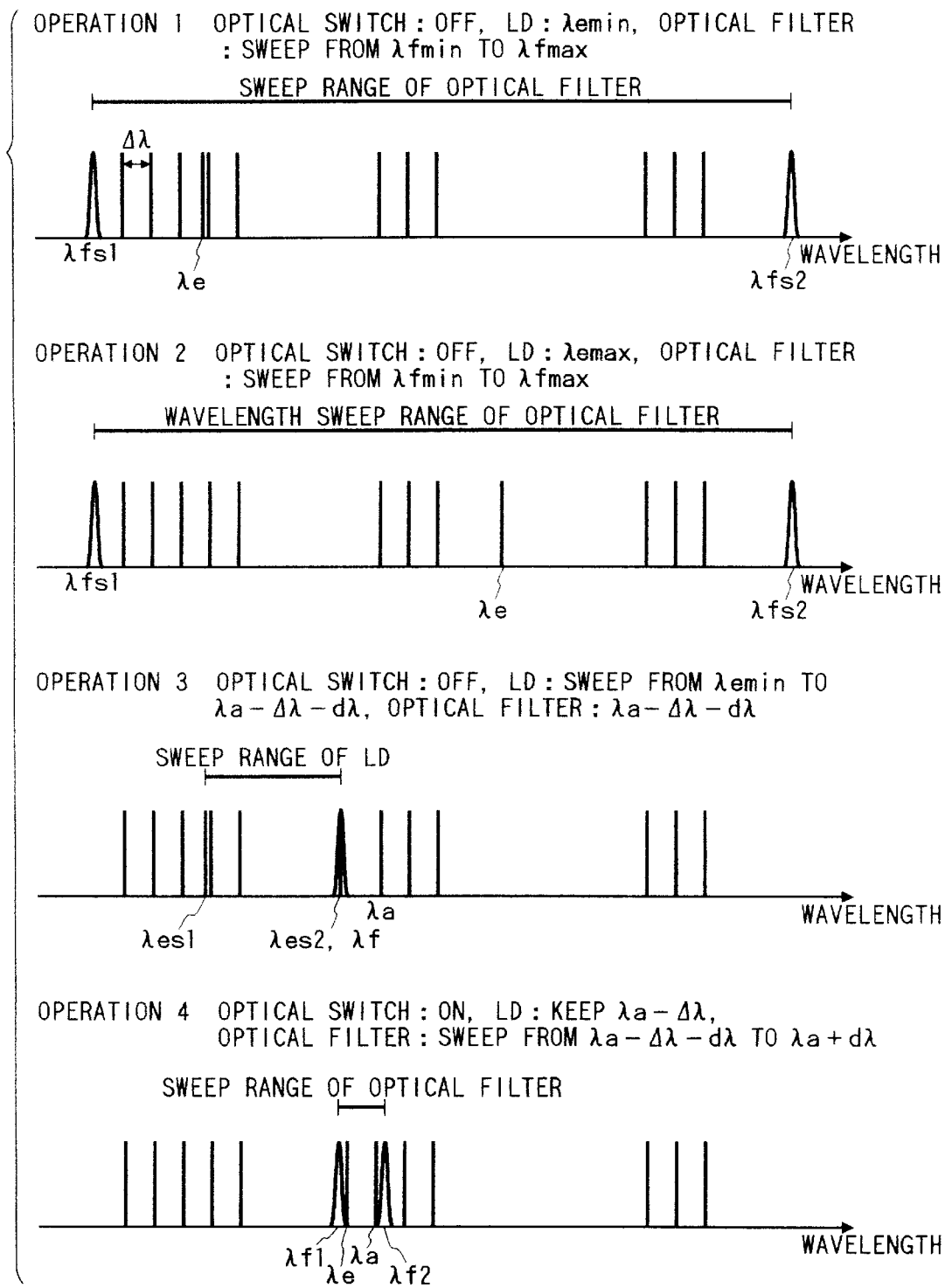
FIG. 13 is an explanatory view of the operation of the wavelength control method according to the third embodiment.

FIG. 13 is an explanatory view of the operation of the third embodiment of the wavelength control method. FIG. 13 includes [operation 1] to [operation 4], and shows the positional relationship between the wavelengths of the LD 2-2 and the optical filter 2-3 in the respective operations. In FIG. 13, the vertical line indicates the wavelength of the LD 2-2, and the mountain-shaped waveform with a sharp peak indicates the passband spectrum of the optical filter 2-3. Let $\lambda$f be the wavelength of the optical filter 2-3, $\lambda$fs1 be the sweep start wavelength in the sweep range of the optical filter 2-3, and $\lambda$fs2 be the sweep end wavelength thereof. Also, let $\lambda$e be the wavelength of the LD 2-2, $\lambda$e1 be the sweep start wavelength in the sweep range of the LD 2-2 shown in [operation 3], and $\lambda$es2 be the sweep end wavelength thereof. The vertical lines other than that indicating the wavelength $\lambda$e represent those of the LDs 2-2 of other terminal stations, which have been performing transmission on the transmission path, before the terminal station whose operations will be described below starts the tuning operation. A wavelength $\lambda$a is that of a channel in the neighborhood of the wavelength of the LD 2-2 of the terminal station whose operations will be described below.

Figure 14A:
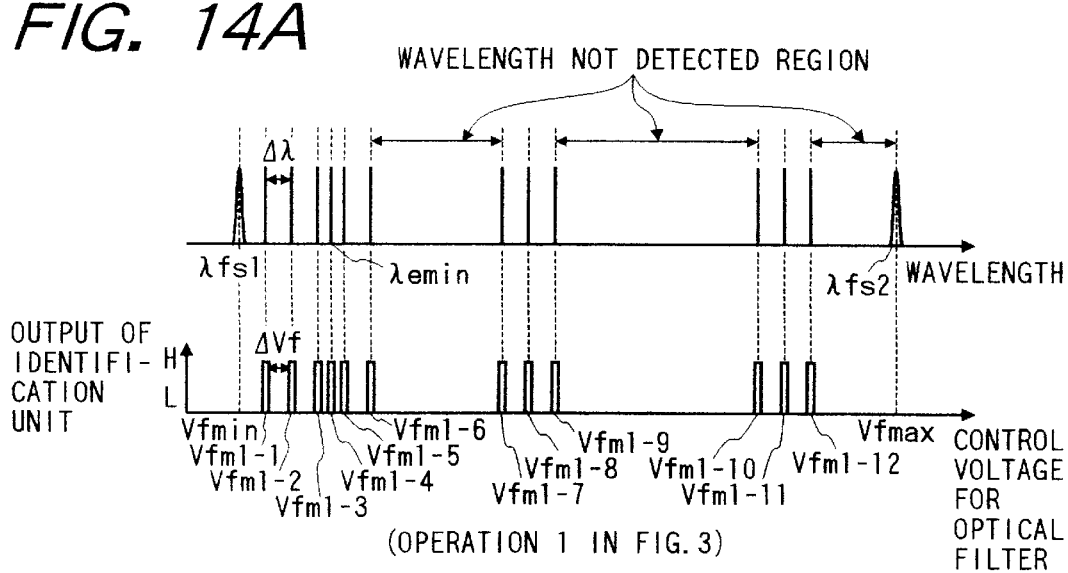
FIGS. 14A to 14C are explanatory views showing the relationship between the control voltage for an optical filter and the output from an decision circuit upon wavelength sweep of the optical filter in the wavelength control method of the third embodiment.
Figure 14B:
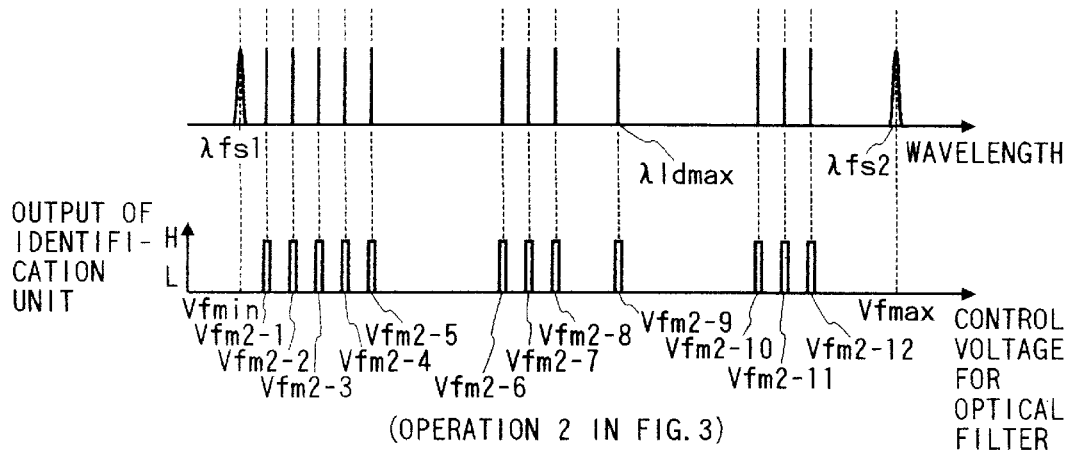
Figure 14C:
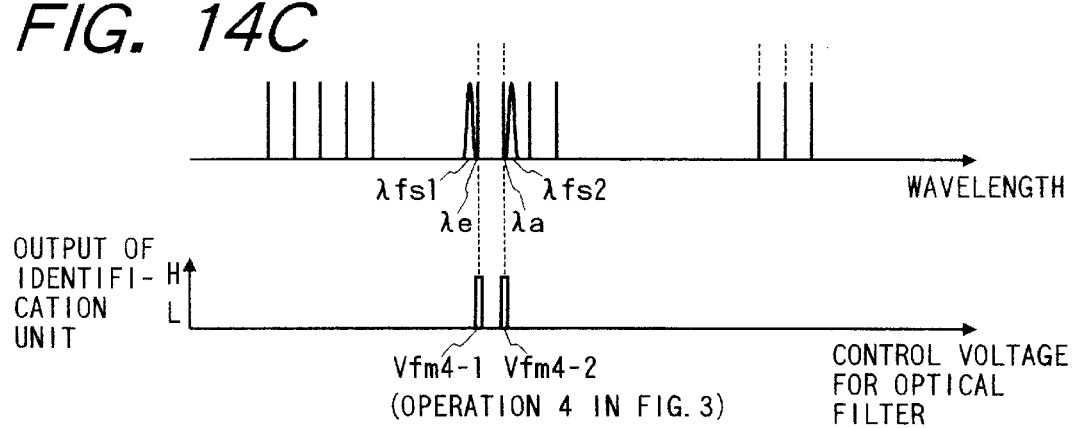

FIGS. 14A to 14C show the relationship between the control voltage Vf for the optical filter and the output from the decision circuit 2-8 upon sweeping the wavelength of the optical filter 2-3. More specifically, FIGS. 14A to 14C show the wavelength in their upper portions and the relationship between the control voltage Vf for the optical filter and the output from the decision circuit 2-8 in their lower portions in correspondence with [operation 1], [operation 2], and [operation 4] in FIG. 13 in which the wavelength of the optical filter 2-3 is swept. The output from the decision circuit 2-8 changes to H at the control voltage Vf for the optical filter, at which the wavelength of the optical filter 2-3 matches the wavelength of the LD 2-2 of another station or the self station. In the respective operations, the control voltage Vf for the optical filter at which the output from the decision circuit 2-8 changes to H is stored in the wavelength control system 2-1.

Figure 15:
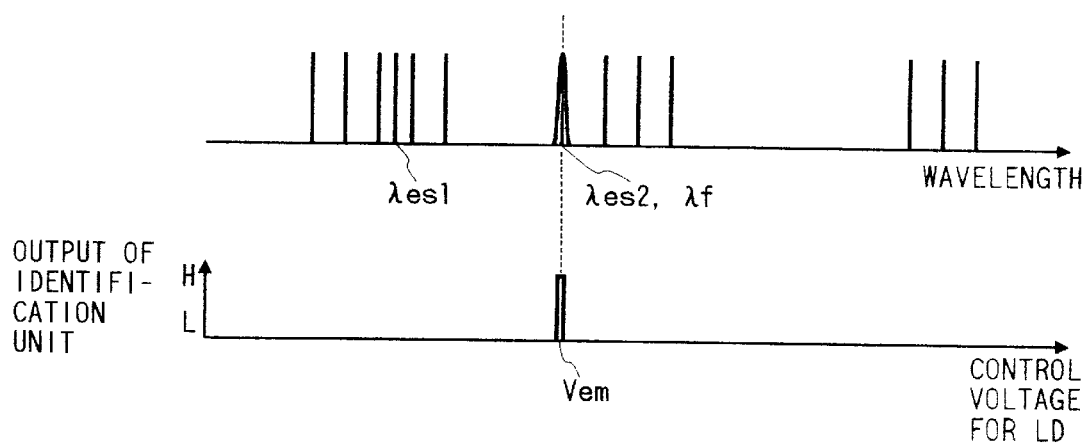
FIG. 15 is an explanatory view showing the relationship between the control voltage for an LD and the output from the decision circuit upon wavelength sweep of the LD in wavelength control method of the third embodiment.

FIG. 15 shows the relationship between the control voltage Ve for the LD and the output from the decision circuit 2-8 upon sweeping the wavelength of the LD 2-2 of the self station. FIG. 15 shows the wavelength in its upper portion and the relationship between the control voltage Ve for the optical filter and the output from the decision circuit 2-8 in its lower portion in correspondence with [operation 3] in FIG. 13 in which the wavelength of the LD 2-2 is swept. The output from the decision circuit 2-8 changes to H at the control voltage Ve for the LD at which the wavelength of the LD 2-2 matches that of the optical filter 2-3. The control voltage Ve for the LD at which the output form the decision circuit 2-8 changes to H is stored as Vem in the wavelength control system 2-1.

In the present invention, transmission is started at the wavelength at the end of an unoccupied space in the wavelength variable range of the LD 2-2 of the terminal station or at the end of the wavelength variable range of this LD, and thereafter, the channel interval $\Delta\lambda$ from the neighboring channel is maintained. As a result, the wavelengths are assigned to form some groups at the intervals $\Delta\lambda$, as shown in FIG. 12.

In order to search for an unoccupied space in the wavelength variable range of the LD 2-2, the positional relationship, on the wavelength axis, between the wavelength of the LD 2-2 of the self station and the transmission wavelengths of other stations must be checked. The optical switch 2-12 shown in FIG. 1 is used for this purpose, and prevents an interference with transmission light from other stations when an unoccupied space is checked and the wavelength of the LD 2-2 is set within the unoccupied space.

The tuning operation for setting the wavelength of the LD 2-2 is performed by the wavelength control system 2-1. Since the basic operations (a sweep operation, an operation for associating Ve with Vf, and the like) of the wavelength control for the tuning operation are the same as those described above, a detailed description thereof will be omitted. The overall tuning operation will be described below with reference to FIGS. 13 to 15.

Note that the setting operations of the step Ves of the control voltage Ve for the LD, the step Vfs of the control voltage Vf for the optical filter, the band width (half-width) $\lambda$fb of the optical filter 2-3, and a margin dVf of the control voltage Vf for the optical filter, which margin allows an error in the system are the same as those in the prior art. An example of the values of the respective parameters will be listed below.

Ves=0.05$\Delta$Ve

Vfs=0.05$\Delta$Vf $\lambda$fb=0.1$\Delta\lambda$ dVf=0.2$\Delta$Vf where $\Delta$Ve is the change amount of the control voltage Ve for the LD corresponding to the wavelength interval $\Delta\lambda$ of adjacent channels, and $\Delta$Vf is the change amount of the control voltage Vf for the optical filter corresponding to the wavelength interval $\Delta\lambda$ of adjacent channels.

The respective operations shown in FIG. 13 will be described below.

(1) [Operation 1] The wavelength assignment obtained when the LD 2-2 emits light at the shortest wavelength is determined. The optical switch 2-12 is set in the OFF state, and the LD 2-2 is turned on to emit light at the shortest wavelength $\lambda$emin. Then, the wavelength of the optical filter 2-3 is swept from $\lambda$fmin to $\lambda$fmax. During the sweep operation, the value of the control voltage Vf for the optical filter obtained when the output from the decision circuit 2-8 changes to H is stored in the wavelength control system 2-1 as Vfm1-n (n=1, 2, . . . ). In FIG. 13, 12 values Vfm1-1 to Vfm1-12 are stored. The value of the control voltage Vf for the optical filter corresponding to the shortest wavelength $\lambda$emin of the LD 2-2 is Vfm1-4.

(2) [Operation 2] The wavelength assignment obtained when the LD 2-2 emits light at the longest wavelength is determined. The optical switch 2-12 is kept in the OFF state, and the LD 2-2 is turned on to emit light at the longest wavelength $\lambda$emax. Then, the wavelength of the optical filter 2-3 is swept from $\lambda$fmin to $\lambda$fmax. During the sweep operation, the value Vf obtained when the output from the decision circuit 2-8 changes to H is stored in the wavelength control system 2-1 as Vfm2-n (n=1, 2, . . . ). In FIG. 13, 12 values Vfm2-1 to Vfm2-12 are stored. The value of the control voltage Vf for the optical filter corresponding to the longest wavelength $\lambda$emax of the LD 2-2 is Vfm2-9.

After the completion of the sweep operation, the values of the control voltage Vf for the optical filter corresponding to $\lambda$emin and $\lambda$emax, and the range of the control voltage Vf for the optical filter corresponding to an unoccupied space are obtained on the basis of Vfm1-n (n=1, 2, . . . ) and Vfm2-n (n=1, 2, . . . ). Of Vfm1-n (n=1, 2, . . . ), a value (in FIG. 13, Vfm1-4) which is not included in Vfm2-n (n=1, 2, . . . ) corresponds to $\lambda$emin. On the other hand, of Vfm2-n (n =1, 2, . . . ), a value (in FIG. 13, Vfm2-9) which is not included in Vfm1-n (n=1, 2, . . . ) corresponds to $\lambda$emax. The unoccupied space is detected on the basis of the difference between two adjacent values (for example, Vfmin and Vfm2-1, Vfm2-1 and Vfm2-2, or Vfm2-12 and Vfmax in FIG. 13) of Vfm2-n (n=1, 2, . . . ) except for the value (Vfm2-9 in FIG. 13) of Vfm2-n corresponding to $\lambda$emax, Vfmin, and Vfmax. If this difference is larger than 2$\Delta$Vf+ dVf, it is determined that an unoccupied space is present in a region between the two values. For example, in FIG. 13, unoccupied spaces are present between Vfm2-5 and Vfm2-6, between Vfm2-8 and Vfm2-10, and between Vfm2-12 and Vfmax. In this embodiment, upon discrimination of the presence/absence of an unoccupied space, only a margin dVf is assured.

When a plurality of terminal stations happen to start their tuning operations, the number of wavelengths of the LDs of other terminal stations may increase during transition from [operation 1] to [operation 2]. At this time, the number of Vfm2-n (n=1, 2, . . . ) (the number of stored values) becomes larger by two or more than the number of Vfm1-n (n=1, 2, . . . ). In this case, the operation is redone from [operation 1].

(3) [Operation 3] The transmission wavelength is set. The optical switch 2-12 is $\lambda$ept in the OFF state, and the control voltage Vf for the optical filter is set to have a value separated toward the unoccupied space side by $\Delta$Vf+dVf from one wavelength at the end of one wavelength group. In FIG. 13, Vfm2-6 is selected from Vfm2-5, Vfm2-6, Vfm2-8, Vfm2-10, Vfm2-12, and Vfmax at the ends of the wavelength groups. The wavelength corresponding to Vfm2-6 is indicated by $\lambda$a. Thereafter, the wavelength of the LD 2-2 begins to be swept from $\lambda$emin, and the sweep operation stops when the output from the decision circuit 2-8 changes to H. The value of the wavelength of the LD 2-2 at that time is stored as Vem (see FIG. 15). Thus, the wavelength of the LD 2-2 is set to be $\lambda$a-$\Delta\lambda$-d$\lambda$.

(4) [Operation 4] The channel interval is kept. The control voltage Vem for the LD is set to be the value corresponding to the wavelength of the LD 2-2 in the previous operation, and when $\lambda$e<$\lambda$a, the control voltage Vf for the optical filter is swept from Vfm-dVf to Vfm+$\Delta$Vf+dVf (corresponding to the wavelength range from $\lambda$e-d$\lambda$ to $\lambda$e+$\Delta\lambda$ +d$\lambda$). On the other hand, when $\lambda$e>$\lambda$a, the control voltage Vf for the optical filter is swept from Vfm-$\Delta$Vf-dVf to Vfm+dVf (corresponding to the wavelength range from $\lambda$e-$\Delta\lambda$-d$\lambda$ to $\lambda$e+d$\lambda$). During the sweep operation, Vf obtained when the output from the decision circuit 2-8 changes to H initially is stored as Vfm4-1, and Vf obtained when the output temporarily changes to L and then changes to H again is stored as Vfm4-2 (in this case, when the output does not change to H again, Vfm2 =Vfm4-1+$\Delta$Vf+dVf is set). Then, [operation 4] is repeated by setting:

(a) when |(Vfm4-2)-(Vfm4-1)-$\Delta$Vf|$\leq$Vfs:

Vem=Vem (b) when $\lambda e<\lambda a$ and $(Vfm4\text{-}2)\text{-}(Vfm4\text{-}1)\text{-}\Delta Vf<-Vfs$:
   Vem=Vem−Ves (c) when $\lambda e<\lambda a$ and $(Vfm4\text{-}2)\text{-}(Vfm4\text{-}1)\text{-}\Delta Vf>Vfs$:
   Vem=Vem+Ves (d) when $\lambda e>\lambda a$ and $(Vfm4\text{-}2)\text{-}(Vfm4\text{-}1)\text{-}\Delta Vf<-Vfs$:
   Vem=Vem+Ves (e) when $\lambda e>\lambda a$ and $(Vfm4\text{-}2)\text{-}(Vfm4\text{-}1)\text{-}\Delta Vf>Vfs$:
   Vem=Vem−Ves With this operation, the interval $\Delta\lambda$ from the neighboring channel ($\lambda a$ in FIG. 13) is maintained within an allowable range. Upon repetition of this operation, if Vem≧Vemax holds, a state of Ve=Vemax is maintained. On the other hand, if Vem≦Vemin holds, a state of Ve=Vemin is maintained.

When the optical transmitter of each terminal station in the communication system performs the above-mentioned operation, some groups are formed by the wavelength assignment. In each group, when a given station starts the tuning operation, the interval $\Delta\lambda$ is maintained with reference to the wavelength of the LD of another station at the end of the group. When the transmission wavelength of another station, which wavelength is used as a reference for a given terminal station, disappears (this state occurs when the other terminal station quits transmission and its transmission wavelength cannot be detected), the transmission wavelength of the given terminal station shifts toward the reference wavelength side with reference to the wavelength of the LD 2-2 of another terminal station. When the transmission wavelength of the terminal station has reached one end of the wavelength variable range of the LD of the self station before it reaches a position separated by the interval $\Delta\lambda$ from the wavelength of the LD 2-2 of another terminal station, the shift operation stops there, and a new group is formed.

(Fourth Embodiment)

The fourth embodiment of the present invention will be described below with reference to the accompanying drawings. Since the arrangement of the optical transmitter in this embodiment is the same as that in FIG. 1, a detailed description thereof will be omitted.

Figure 16:
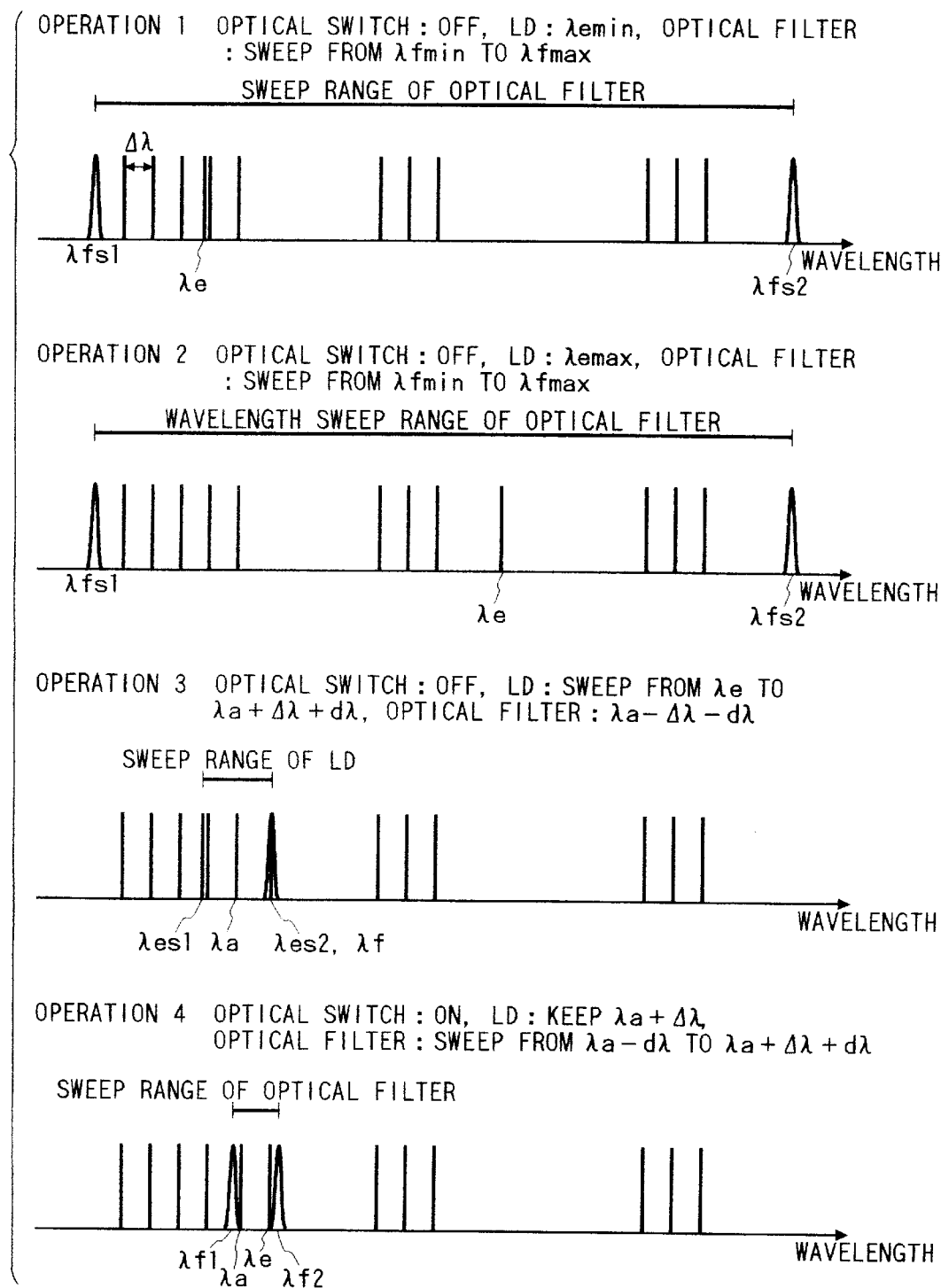
FIG. 16 is an explanatory view showing the operation of a wavelength control method according to the fourth embodiment.

FIG. 16 is an explanatory view of the operation of the fourth embodiment of the wavelength control method according to the present invention. FIG. 16 includes [operation 1] to [operation 4], and shows the positional relationship between the wavelengths of the LD 2-2 and the optical filter 2-3 in the respective operations. In this embodiment, the setting operation of the neighboring channel is different from the third embodiment. Therefore, [operation 3] and [operation 4] are slightly different from those in the third embodiment. The differences will be explained below.

In this embodiment, the neighboring channel is selected to form a larger wavelength group as much as possible as a result of the tuning operation. For this purpose, in [operation 1] and [operation 2], the optical switch 2-12 is set in the OFF state, the shortest and longest wavelengths of the LD 2-2 of the self station, and the transmission wavelengths of other stations are detected, thus ending these operations. Thereafter, the numbers of transmission wavelengths belonging to the respective wavelength groups are calculated on the basis of Vfm2-n (n=1, 2, . . . ), and a wavelength at one end of the group, one end of which falls within the wavelength variable range of the LD 2-2 of this terminal station and to which a largest number of wavelengths belong is determined as the neighboring channel. In FIG. 16, of three groups, a wavelength that satisfies the above-mentioned condition is the longest wavelength $\lambda a$ of the leftmost group in FIG. 16. [Operation 3] and [operation 4] are performed with reference to this wavelength $\lambda a$, and the light-emission wavelength $\lambda e$ of the self station is set on the longer wavelength side of the wavelength $\lambda a$ to maintain the channel interval $\Delta\lambda$.

As described above, in this embodiment, the tuning operation is performed so as to increase the number of transmission wavelengths in a wavelength group to be formed as much as possible. For this reason, the number of groups can be minimized within the wavelength sweep range of the optical filter, and odd gap wavelength regions formed between adjacent groups can be eliminated.

(Fifth Embodiment)

The fifth embodiment of the present invention will be described in detail below with reference to the accompanying drawings. The arrangement of the optical transmitter in the fifth embodiment is substantially the same as that shown in FIG. 1, and a detailed description thereof will be omitted. FIGS. 17A to 17E are explanatory views of the operation of the fifth embodiment of the wavelength control method according to the present invention. In this embodiment, operations when wavelength groups are formed to be close to each other are classified into five operations shown in FIGS. 17A to 17E. The wavelength is plotted along the abscissa, and each vertical line indicates the transmission wavelength of one terminal station. In the state wherein the groups are formed by the third or fourth embodiment, $\lambda 1$ to $\lambda 9$ respectively correspond to the transmission wavelengths of terminal stations 1 to 9. The arrow above each vertical line indicating a wavelength represents the direction ($\leftarrow$, $\rightarrow$) of the reference neighboring wavelength or self reference ($\downarrow$).

Figure 18A:
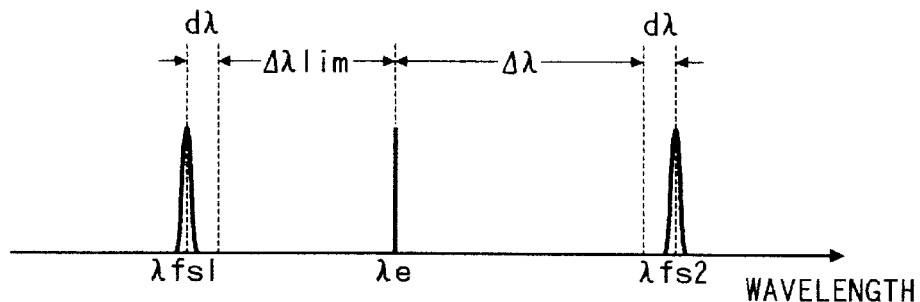
FIGS. 18A and 18B are explanatory views showing the sweep range of an optical filter in the wavelength control method of the fifth embodiment.
Figure 18B:
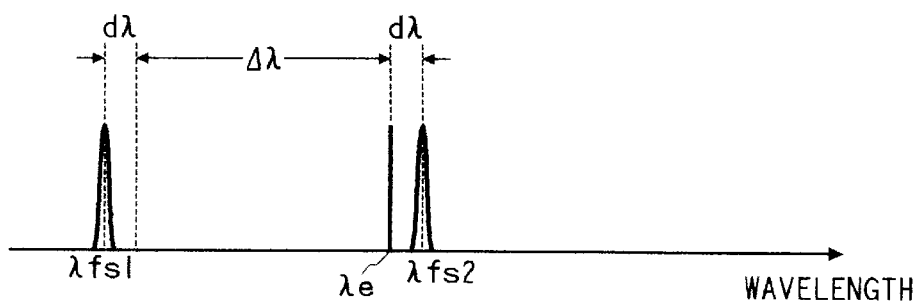

FIGS. 18A and 18B show the sweep range of the optical filter 2-3 in this embodiment. In FIGS. 18A and 18B, the tuning operation reaches a steady state, and the wavelength interval $\Delta\lambda$ from the reference neighboring wavelength is maintained. FIG. 18A shows a case wherein the reference neighboring wavelength is set on the longer wavelength side, and FIG. 18B shows a case wherein the reference neighboring wavelength is set on the shorter wavelength side. The wavelength is plotted along the abscissa, and the vertical line indicates the transmission wavelength, $\lambda e$, of this terminal station. The wavelength with a sharp peak indicates the passband spectrum of the optical filter 2-3. Let $\lambda f$ be the wavelength of the optical filter 2-3, $\lambda fs1$ be the sweep start wavelength, and $\lambda fs2$ be the sweep end wavelength. $\Delta\lambda\text{lim}$ is the wavelength interval within which an interference prevention operation is started. This interval is set to be a value between the channel wavelength interval $\Delta\lambda$ and a wavelength interval that causes an interference. In this embodiment, this interval is set to be the middle value between the channel wavelength interval $\Delta\lambda$ and the wavelength interval that causes an interference.

In this wavelength control method, the wavelengths are relatively associated and controlled on the basis of the control voltage Ve for the LD and the control voltage Vf for the optical filter when the wavelength of the LD 2-2 (of the self station or another station) matches that of the optical filter 2-3, thereby maintaining the predetermined channel interval $\Delta\lambda$. $\Delta Ve$ and $\Delta Vf$ stored in the wavelength control system 2-1 have an error with respect to the channel interval $\Delta\lambda$. For this reason, the wavelength sweep range for relatively associating the wavelengths have margins on the two ends so as to allow the error. In this method, the control voltage Vf for the optical filter serves as a reference for the wavelength control. In the following description, the margin of the control voltage Vf for the optical filter is represented by dVf. The value dVf is preferably set to be a fraction to 1/10 of $\Delta vf$.

The operation of this embodiment will be described below. In this embodiment, a terminal station which has a reference neighboring wavelength on the longer wavelength side detects a wavelength that approaches from the shorter wavelength side of the wavelength of the self station, and performs an interference prevention operation.

Figure 17A:
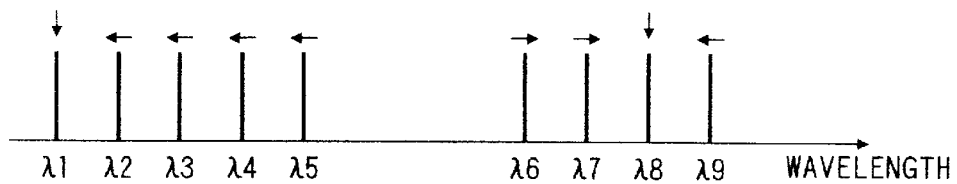
FIGS. 17A to 17E are explanatory views showing the operation of a wavelength control method according to the fifth embodiment.

A case will be described below wherein the tuning operations of all the terminal stations, which are performing transmission in the communication system, are in the steady state (FIG. 17A). In the left group in FIG. 17A, terminal station 1 starts a tuning operation, and stops the operation at the shorter wavelength end ($\lambda 1$) of the wavelength variable range of the LD of the self station. Then, terminal stations 2 to 5 start tuning operations in turn, and maintain the wavelength intervals $\Delta\lambda$ using wavelengths on their shorter wavelength side as the reference neighboring wavelengths. As a result, in the left group, wavelengths $\lambda 1, \lambda 2, \lambda 3, \lambda 4$, and $\lambda 5$ are assigned in this order from the shorter wavelength side at the wavelength intervals $\Delta\lambda$. In the right group, terminal station 8 starts a tuning operation, and stops the operation at the longer wavelength end ($\lambda 8$) of the wavelength variable range of the LD 2-2 of the self station. Then, terminal stations 6 and 7 start tuning operations in turn, and set their wavelengths at the wavelength intervals $\Delta\lambda$ using wavelengths on their longer wavelength side as the reference neighboring wavelengths. Terminal station 9 starts a tuning operation after terminal station 8 has started the tuning operation, and maintains the wavelength interval $\Delta\lambda$ using a wavelength on its shorter wavelength side as the reference neighboring wavelength. As a result, wavelengths $\lambda 6, \lambda 7, \lambda 8$, and $\lambda 9$ are assigned in this order from the shorter wavelength side at the wavelength intervals $\Delta\lambda$.

In this steady state, in each of terminal stations ($\lambda 6$ and $\lambda 7$) which have wavelengths on their longer wavelength side as the reference neighboring wavelengths, the wavelength of the optical filter is swept within the range shown in FIG. 18A. The sweep range corresponds to the range from $\lambda e-\Delta\lambda lim-d\lambda$ to $\lambda e+\Delta\lambda+d\lambda$. With this sweep operation, the terminal station detects any deviation of the wavelength interval from the reference neighboring wavelength on the longer wavelength side, and the presence/absence of a wavelength that approaches from the shorter wavelength side. A terminal station ($\lambda 8$) whose wavelength corresponds to the longer wavelength end of the wavelength variable range of the LD 2-2 of the self station performs the sweep operation within the same range. However, in this terminal station, the sweep operation is used for detecting only the presence/absence of a wavelength that approaches from the shorter wavelength side.

In each of terminal stations ($\lambda 2, \lambda 3, \lambda 4, \lambda 5$, and $\lambda 9$) which have wavelengths on their shorter wavelength side as the reference neighboring wavelengths, the wavelength of the optical filter is swept within the range shown in FIG. 18B. The sweep range corresponds to the range from $\lambda e-\Delta\lambda-d\lambda$ to $\lambda e+d\lambda$. With this sweep operation, the terminal station detects any deviation of the wavelength interval from the reference neighboring wavelength on the shorter wavelength side. A terminal station ($\lambda e$) whose wavelength corresponds to the shorter wavelength end of the wavelength variable range of the LD 2-2 of the self station performs the sweep operation within the same range but this operation is a formal one.

Figure 17B:
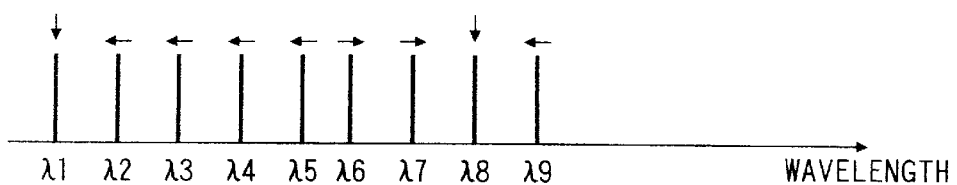
Figure 17C:
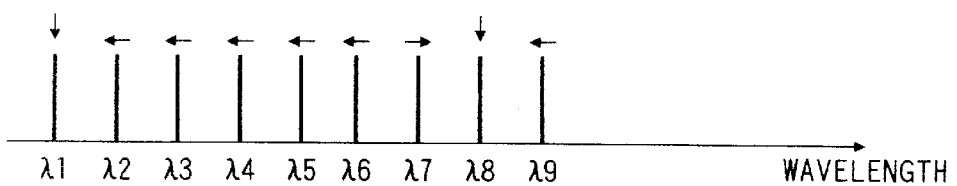
Figure 17D:
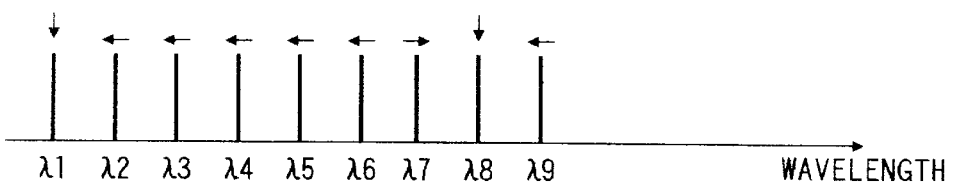
Figure 17E:
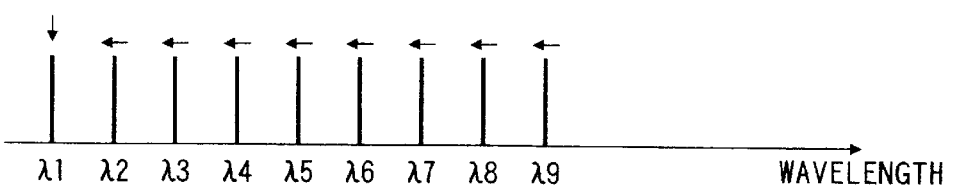

FIGS. 17B to 17E show the interference prevention operation. A case will be explained below wherein $\lambda 8$ drifts toward the shorter wavelength side. When $\lambda 8$ drifts toward the shorter wavelength side, $\lambda 7$ and $\lambda 9$ which maintain the wavelength intervals with reference to $\lambda 8$ also shift toward the shorter wavelength side. Then, $\lambda 6$ which maintains the interval with reference to $\lambda 7$ also shifts toward the shorter wavelength side. As a result, $\lambda 5$ and $\lambda 6$ approach each other, as shown in FIG. 17B. When terminal station 6 detects the approach of $\lambda 5$ by the sweep operation of the optical filter 2-3, and the wavelength interval between $\lambda 5$ and $\lambda 6$ becomes equal to or smaller than $\Delta\lambda lim+d\lambda$, terminal station 6 switches its operation direction, so that a wavelength on the shorter wavelength side is used as the reference neighboring wavelength. More specifically, as shown in FIG. 17C, station 6 uses $\lambda 5$ as the reference neighboring wavelength. Since the reference neighboring wavelength is switched to $\lambda 5$, $\lambda 6$ is controlled to have the wavelength interval $\Delta\lambda$ from $\lambda 5$, and shifts toward the longer wavelength side, as shown in FIG. 17D. When $\lambda 8$ further drifts toward the shorter wavelength side, terminal station 7, and then, terminal station 8 perform the same operations. As a result, terminal stations other than terminal station 1 operate using wavelengths on their shorter wavelength side as the reference neighboring wavelengths, as shown in FIG. 17E.

As described above, when one group approaches another group in the wavelength assignment, an interference between channels located at the ends of these groups can be prevented.

(Sixth Embodiment)

The sixth embodiment of the present invention will be described in detail below with reference to the accompanying drawings. The arrangement of the optical transmitter in the sixth embodiment is the same as that shown in FIG. 1. FIGS. 19A to 19F are explanatory views of the operation of the sixth embodiment of the wavelength control method according to the present invention. The symbols in FIGS. 19A to 19F are the same as those in FIGS. 17A to 17E. In this embodiment, the operation is classified into steps shown in FIGS. 19A to 19F, and the operations in FIGS. 19C to 19F are different from those in FIGS. 17A to 17E.

Figure 20A:
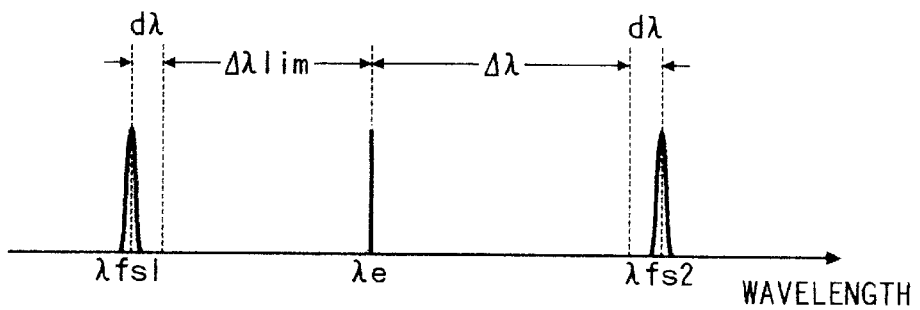
FIGS. 20A and 20B are explanatory views showing the sweep range of an optical filter in the wavelength control method of the sixth embodiment.
Figure 20B:
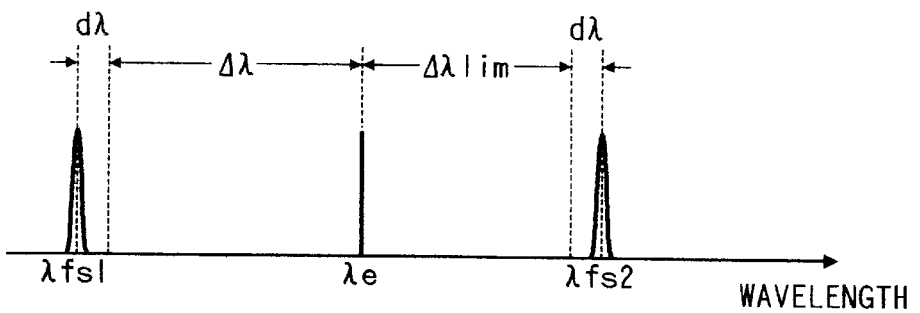

FIGS. 20A and 20B show the sweep range of the optical filter 2-3 in this embodiment. The symbols in FIGS. 20A and 20B are the same as those in FIGS. 18A and 18B, i.e., the wavelength is plotted along the abscissa, the vertical line indicates the transmission wavelength $\lambda e$ of this terminal station, and the waveform with a sharp peak represents the passband spectrum of the optical filter 2-3. FIG. 20B is different from FIG. 18B.

In this embodiment, all the terminal stations detect wavelengths that approach from the side opposite to their reference neighboring wavelengths, and perform interference prevention operations. For this purpose, the sweep range of the optical filter is symmetrical about the transmission wavelength $\lambda e$ of the self station between a case wherein a wavelength on the longer wavelength side is used as the reference neighboring wavelength and a case wherein a wavelength on the shorter wavelength side is used as the reference neighboring wavelength. When the wavelength on the longer wavelength side is used as the reference neighboring wavelength (FIG. 20A), the sweep range corresponds to the range from $\lambda e-\Delta\lambda lim-d\lambda$ to $\lambda e+\Delta\lambda+d\lambda$, and when the wavelength on the shorter wavelength side is used as the reference neighboring wavelength (FIG. 20B), the sweep range corresponds to the range from $\lambda e-\Delta\lambda-d\lambda$ to $\lambda e+\Delta\lambda lim+d\lambda$.

Figure 19A:
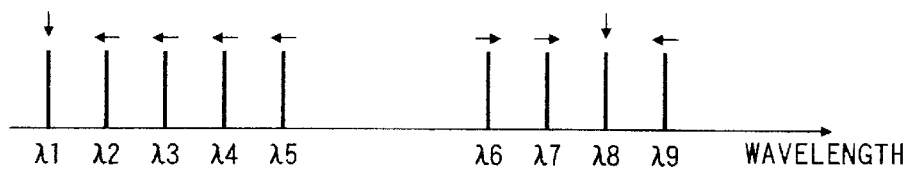
FIGS. 19A to 19F are explanatory views showing the operation of a wavelength control method according to the sixth embodiment.
Figure 19B:
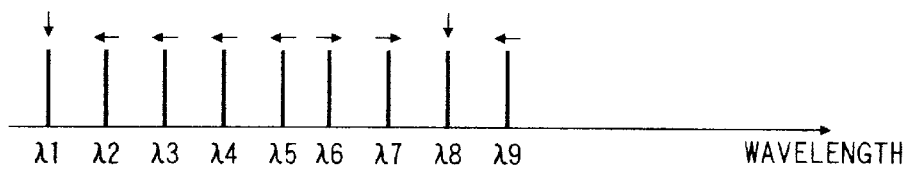
Figure 19C:
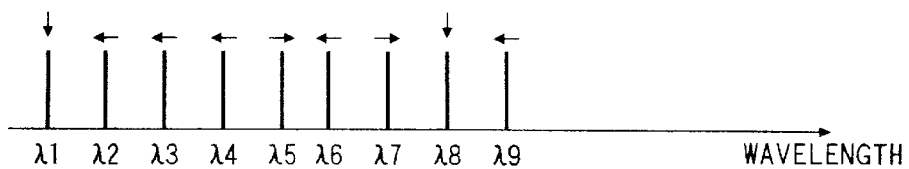
Figure 19D:
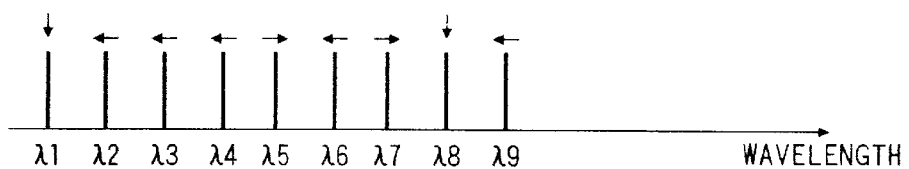
Figure 19E:
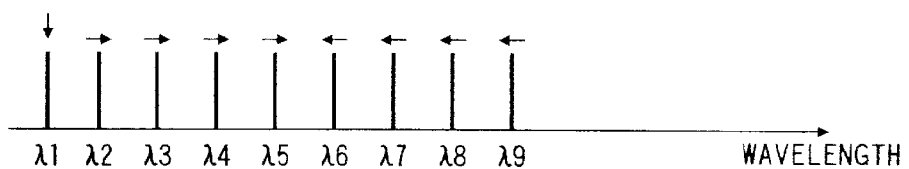
Figure 19F:
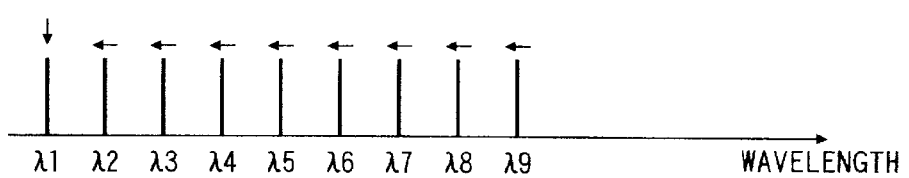

Assume that two groups are formed in the steady state shown in FIG. 19A, as in the fifth embodiment. A case will be explained below wherein $\lambda 8$ drifts toward the shorter wavelength side. In this embodiment, in the state shown in FIG. 19B, terminal stations 5 and 6 start interference prevention operations. Terminal stations 5 and 6 switch their reference neighboring wavelengths when the wavelength interval between λ5 and λ6 becomes equal to or smaller than Δλlim+dλ. That is, as shown in FIG. 19C, terminal station 5 sets λ6 as the reference neighboring wavelength, and terminal station 6 sets λ5 as the reference neighboring wavelength. With this operation, as shown in FIG. 19D, λ5 shifts toward the shorter wavelength side, and λ6 shifts toward the longer wavelength side. When λ8 further drifts toward the shorter wavelength side, the above-mentioned operation is performed in pairs of terminal stations (e.g., λ4 and λ5, and λ6 and λ7 in FIG. 19D), each pair of which have their reference neighboring wavelengths on their outer sides. As shown in FIG. 19E, terminal stations 4, 3, and 2 switch their reference neighboring wavelengths to those on their longer wavelength side in this order, and terminal stations 7, 8, and 9 switch their reference neighboring wavelengths to those on their shorter wavelength side in this order. Subsequently, when the wavelength interval between terminal stations 1 and 2 becomes equal to or smaller than Δλlim+dλ, terminal stations which use wavelengths on their longer wavelength side as the reference neighboring wavelengths switch their reference directions in turn, and finally, as shown in FIG. 19F, the wavelengths of terminal stations 1 to 9 having the reference direction on their shorter wavelength side are set to maintain the channel intervals Δλ with reference to the wavelength λe of terminal station 1.

In this embodiment, since all the terminal stations monitor wavelengths on the side opposite to their reference neighboring wavelengths, an interference can be prevented even when the interference prevention operation of a terminal station which transmits a wavelength that approaches from the side opposite to the reference neighboring wavelength is delayed for some reason or is not performed.

The constituting elements in each of the first to sixth embodiments described above are not limited to those described in the embodiments as long as they have the same functions as those in the embodiments. The same applies to a system constituted by some constituting elements. Furthermore, the various numerical values described above are not limited to those described in the embodiments as long as they fall within an allowable operation range.

More specifically, the three-electrode λ/4 shift MQE-DFB-LD is used as the LD 2-2. Alternatively, a multi-electrode DBR (Distributed Bragg Reflector)-LD or the like may be used. Also, the fiber Fabry-Perot type filter is used as the optical filter 2-3. Alternatively, a semiconductor type optical filter such as a DFB-LD filter or the like may be used. In the wavelength control system 2-1, a system based on micro-modulation is used as a lock-stabilization control system. However, other control systems may be used.

The operation of the wavelength control system may be replaced by other operations that can detect an unoccupied space of wavelengths, and can hold a wavelength interval that does not cause any interference with the neighboring channel (wavelength) in the steady state of the tuning operation.

In the fifth and sixth embodiments, the operation of the wavelength control system may be replaced by other operations as long as the reference neighboring wavelength or a wavelength on the side opposite to the reference neighboring wavelength is detected to control the wavelength of the self station so as to maintain a wavelength interval that does not cause any interference with the reference neighboring wavelength, and an interference is prevented by detecting a wavelength that approaches from the side opposite to the reference neighboring wavelength.

More specifically, in the fifth embodiment, terminal stations that detect wavelengths on the side opposite to their reference neighboring wavelengths and perform an interference prevention operation are limited to those having their reference neighboring wavelengths on the shorter wavelength side. Alternatively, such stations may be limited to those having their reference neighboring wavelengths on the longer wavelength side.

Furthermore, in each of the above embodiments, the wavelength sweep range of the optical filter 2-3 need only extend by Δλ or more on the reference neighboring wavelength side, and additionally extend by Δλlim or more on the opposite side in the fifth and sixth embodiments. For example, the entire wavelength range of the communication system may be used as the sweep range. Note that Δλlim can be set to be an arbitrary value between a wavelength interval that does not cause any interference and Δλ.

Each of the above embodiments exemplifies a system constituted by the star coupler shown in FIG. 9. The present invention may be applied to bus, star, and ring type systems, i.e., to any other systems that perform wavelength division multiplex optical communications.

As described above, according to the present invention, when an unoccupied space is present within the wavelength variable range of the LD of the optical transmitter, transmission can be performed, and the wavelength variable range of the LD can be effectively used.

Furthermore, according to the present invention, the number of wavelength groups formed in the wavelength assignment of the communication system by the method of the present invention can be reduced, and odd regions formed between adjacent wavelength groups can be eliminated, thus increasing the number of channels of the communication system.

In addition, according to the present invention, an interference caused by the wavelength located at the end of the group formed by the wavelength assignment can be prevented, and system reliability can be improved.

Moreover, according to the present invention, the interference prevention operation can be attained by some terminal stations, and even when wavelength groups are formed, some terminal stations can effectively prevent an interference with terminal stations in another group.

What is claimed is:

1. An output light wavelength control method for an optical transmitter used in an optical communication system for performing wavelength division multiplex communication on an optical transmission path, said method comprising the steps of:

detecting a wavelength of light on the optical transmission path;

searching for an unoccupied space, in which light to be output from said optical transmitter does not interfere with another light on the optical transmission path, based on a result of said detecting step;

controlling the wavelength of the light to be output from said optical transmitter so that the light to be output has a wavelength within the unoccupied space;

setting, as a reference side wavelength, a wavelength of another light which is adjacent to the wavelength of the light to be output from said optical transmitter on one of the longer and shorter wavelength sides along a wavelength axis; and controlling an interval between the wavelength of the light to be output and the reference side wavelength to assure that the interval is close to a predetermined first wavelength interval.

2. A method according to claim 1, said detecting step detecting the wavelength by sweeping a detectable wavelength of wavelength detection means in the transmitter.

3. A method according to claim 2, said detecting step detecting the wavelength by sweep-detecting a region including at least a wavelength variable range of the output light from said optical transmitter.

4. A method according to claim 2, wherein, in said detecting step, light-emission means of said optical transmitter is controlled to emit light upon sweep detection, light output from the light-emission means is input to the wavelength detection means, and the detectable wavelength of the wavelength detection means is swept to detect a wavelength of the light output from the light-emission means of said optical transmitter together with a wavelength of another light on the optical transmission path.

5. A method according to claim 4, wherein light output from the light-emission means of said optical transmitter is input to the wavelength detection means without being output onto the optical transmission path to detect a wavelength of the light output from the light-emission means of said optical transmitter together with a wavelength of another light on the optical transmission path.

6. A method according to claim 4, wherein, in said detecting step, the wavelength of the light output from the light-emission means of said optical transmitter is distinguished from the wavelength of the other light on the optical transmission path by comparing a sweep detection result obtained when the light-emission means of said optical transmitter emits light with a sweep detection result obtained when the light-emission means of said optical transmitter does not emit light.

7. A method according to claim 1, wherein, in said step of controlling the wavelength of the light to be output, a detectable wavelength of wavelength detection means of said optical transmitter is set within the unoccupied space identified in said searching step, and a wavelength of light output from light-emission means of said optical transmitter is swept to match the detectable wavelength, so as to control the light-emission means to emit light at a wavelength in the unoccupied space.

8. A method according to claim 7, wherein, in said setting step, the detectable wavelength is set at an end portion on one of the longer and shorter wavelength sides in the unoccupied space.

9. A method according to claim 1, wherein light output from light-emission means of said optical transmitter is not output onto the optical transmission path before the light-emission means of said optical transmitter is controlled in said step of controlling the wavelength of the light to be output to emit light at a wavelength within the unoccupied space.

10. A method according to claim 1, wherein, in said step of controlling the wavelength interval, the wavelength interval between the light to be output from said optical transmitter and the reference side wavelength is always detected, and light-emission means of said optical transmitter is controlled to assure that the wavelength interval is close to the first wavelength interval.

11. A method according to claim 1, further comprising a step of detecting the number of wavelengths belonging to each of a plurality of wavelength groups each consisting of a plurality of wavelengths, each of the plurality of wavelengths being assigned on the optical transmission path at predetermined wavelength intervals, and wherein a wavelength at an end portion of the wavelength group which falls within the wavelength variable range of the output light of said optical transmitter and includes a largest number of wavelengths is set to be the reference side wavelength.

12. A method according to claim 11, wherein, in said step of searching for the unoccupied space, the number of wavelengths is detected.

13. A method according to claim 1, wherein when the wavelength interval between the reference side wavelength and the wavelength of the light to be output from said optical transmitter is controlled in said step of controlling the wavelength interval to have a value near the predetermined first wavelength interval, and when a wavelength interval between the wavelength of the light to be output from said optical transmitter and an opposite side wavelength adjacent to the wavelength of the light to be output from said optical transmitter on a side opposite to the reference side wavelength becomes not more than a predetermined second interval, the opposite side wavelength is set to be the reference side wavelength.

14. An output light wavelength control method for an optical transmitter used in an optical communication system for performing wavelength division multiplex communication on an optical transmission path, said method comprising the steps of:

detecting a wavelength of light on the optical transmission path;

setting, as a reference side wavelength, a wavelength of another light which is adjacent to the wavelength of the light to be output from said optical transmitter on one of the longer and shorter wavelength sides along a wavelength axis;

controlling an interval between the wavelength of the light to be output and the reference side wavelength to assure that the interval is close to a predetermined first wavelength interval; and controlling to set an opposite side wavelength, which is adjacent to the wavelength of the light to be output from said optical transmitter on a side opposite to the reference side wavelength, to be the reference side wavelength, when the wavelength interval between the reference side wavelength and the wavelength of the light to be output from said optical transmitter is maintained to have a value near the predetermined first wavelength interval, and when a wavelength interval between the wavelength of the light to be output from said optical transmitter and the opposite side wavelength becomes not more than a predetermined second interval.

15. A method according to claim 14, said detecting step detecting the wavelength by sweeping a detectable wavelength of wavelength detection means in the transmitter.

16. A method according to claim 15, said detecting step detecting the wavelength by sweep-detecting a region including at least a wavelength variable range of the output light from said optical transmitter.

17. A method according to claim 15, wherein, in said detecting step, light-emission means of said optical transmitter is controlled to emit light upon sweep detection, light output from the light-emission means is input to the wavelength detection means, and the detectable wavelength of the wavelength detection means is swept to detect a wavelength of the light output from the light-emission means of said optical transmitter together with a wavelength of another light on the optical transmission path.

18. A method according to claim 17, wherein light output from the light-emission means of said optical transmitter is input to the wavelength detection means without being output onto the optical transmission path to detect a wavelength of the light output from the light-emission means of said optical transmitter together with a wavelength of another light on the optical transmission path.

19. A method according to claim 17, in said detecting step, the wavelength of the light output from the light-emission means of said optical transmitter is distinguished from the wavelength of the other light on the optical transmission path by comparing a sweep detection result obtained when the light-emission means of said optical transmitter emits light with a sweep detection result obtained when the light-emission means of said optical transmitter does not emit light.

20. A method according to claim 14, wherein before said step of controlling an interval between the reference side wavelength and the wavelength of the light to be output from said optical transmitter, said method further comprises the steps of:

searching for an unoccupied space, in which light to be output from said optical transmitter does not interfere with another light on the optical transmission path, based on a result of said detecting step; and controlling the wavelength of the light to be output from said optical transmitter so that the light to be output has a wavelength within the unoccupied space.

21. A method according to claim 20, wherein, in said step of controlling the wavelength of the out-put light to be output, a detectable wavelength of wavelength detection means of said optical transmitter is set within the unoccupied space identified in said searching step, and a wavelength of light output from light-emission means of said optical transmitter is swept to match the detectable wavelength, so as to control the light-emission means to emit light at a wavelength in the unoccupied space.

22. A method according to claim 21, wherein, in said setting step, the detectable wavelength is set at an end portion on one of the longer and shorter wavelength sides in the unoccupied space.

23. A method according to claim 20, wherein light output from light-emission means of said optical transmitter is not output onto the optical transmission path until the light-emission means of said optical transmitter is controlled in said step of controlling the wavelength of the light to be output from said optical transmitter to emit light at a wavelength within the unoccupied space.

24. A method according to claim 14, wherein, in said step of controlling the wavelength interval, the wavelength interval between the light to be output from said optical transmitter and the reference side wavelength is always detected, and light-emission means of said optical transmitter is controlled to assure that the wavelength interval is close to the first wavelength interval.

25. A method according to claim 14, further comprising a step of detecting the number of wavelengths belonging to each of a plurality of wavelength groups each consisting of a plurality of wavelengths, each of the plurality of wavelengths being assigned on the optical transmission path at predetermined wavelength intervals, and wherein a wavelength at an end portion of the wavelength group which falls within the wavelength variable range of the light to be output of said optical transmitter and includes a largest number of wavelengths is set to be the reference side wavelength.

26. A method according to claim 25, wherein in said step of searching for the unoccupied space, the number of wavelengths is detected.

27. An optical transmitter used in an optical communication system for performing a wavelength division multiplex communication on an optical transmission path, said transmitter comprising:

light-emission means for outputting light;
wavelength detection means for detecting a wavelength of light on the optical transmission path and for detecting a wavelength of the output light from said light-emission means;

means for recognizing an unoccupied space, in which the light to be output from said optical transmitter does not interfere with another light on the optical transmission path, based on a detection result of the wavelength of the light on the optical transmission path by said wavelength detection means;

setting means for setting, as a reference side wavelength, a wavelength of another light which is adjacent to the wavelength of the light to be output from said optical transmitter on one of the longer and shorter wavelength sides along a wavelength axis; and control means for performing wavelength control to control a wavelength interval between the reference side wavelength and the wavelength of the light to be output from said optical transmitter to assure that the interval is close to a predetermined first wavelength interval.

28. An optical transmitter according to claim 27, further comprising means for recognizing the number of wavelengths belonging to each of a plurality of wavelength groups each consisting of a plurality of wavelengths each of the plurality of wavelengths being assigned on the optical transmission path at predetermined wavelength intervals.

29. An optical transmitter according to claim 28, wherein said means for recognizing the unoccupied space also serves as said means for recognizing the number of wavelengths belonging to each of a plurality of wavelength groups.

30. An optical transmitter according to claim 27, said wavelength detection means comprising a wavelength variable bandpass filter for controlling a wavelength.

31. An optical transmitter according to claim 27, said light-emission means comprising a wavelength variable laser for controlling a wavelength.

32. An optical transmitter/receiver used in an optical communication system for performing a wavelength division multiplex communication on an optical transmission path, said optical transmitter/receiver comprising:

an optical transmitter comprising:
light-emission means for outputting light;
wavelength detection means for detecting a wavelength of light on the optical transmission path and for detecting a wavelength of the output light from said light-emission means;
means for recognizing an unoccupied space, in which the output light to be output from said optical transmitter does not interfere with another light on the optical transmission path, based on a detection result of the wavelength of the light on the optical transmission path by said wavelength detection means;
setting means for setting, as a reference side wavelength, a wavelength of another light which is adjacent to the wavelength of the light to be output from said optical transmitter on one of the longer and shorter wavelength sides along a wavelength axis;
control means for performing wavelength control to control a wavelength interval between the reference side wavelength and the wavelength of the light to be output from said optical transmitter to assure that the interval is close to a predetermined first wavelength interval; and a receiver for selecting an optical signal to be received by said optical transmitter/receiver from input optical signals, and receiving the optical signal so as to change a reception wavelength to follow a variation in wavelength of the optical signal.

33. An optical communication system for performing a wavelength division multiplex communication by connecting a plurality of terminal stations each having an optical transmitter, each optical transmitter comprising:

light-emission means for outputting light;

wavelength detection means for detecting a wavelength of light on the optical transmission path and for detecting a wavelength of the output light from said light-emission means;

means for recognizing an unoccupied space, in which the light to be output from said optical transmitter does not interfere with another light on the optical transmission path, based on a detection result of the wavelength of the light on the optical transmission path by said wavelength detection means; and setting means for setting, as a reference side wavelength, a wavelength of another light which is adjacent to the wavelength of the light to be output from said optical transmitter on one of the longer and shorter wavelength sides along a wavelength axis, wherein, in said optical communication system, transmission wavelengths of said optical transmitters of said plurality of terminal stations are wavelength-multiplexed in turn from one of the longer and shorter wavelength sides on a wavelength axis in an unoccupied space within a wavelength range, in which said optical transmitter of each of said plurality of terminal stations that perform transmission can emit light, in a transmission start order.

34. A method according to claim 1, wherein in said detecting step the wavelength of light is detected by a wavelength filter.

35. A method according to claim 14, wherein in said detecting step the wavelength of light is detected by a wavelength filter.

* * * * *

UNITED STATES PATENT AND TRADEMARK OFFICE
CERTIFICATE OF CORRECTION

PATENT NO. : 5,886,802
DATED : March 23, 1999
INVENTOR(S) : MASAO MAJIMJA

It is certified that error appears in the above-indentified patent and that said Letters Patent is hereby corrected as shown below:

TITLE PAGE [56] U.S. PATENT DOCUMENTS,
"Audovin et al." should read --Audouin et al.--.

COLUMN 2,
Line 40, "side" should read --sides--; and
Line 67, "side" should read --sides--.

COLUMN 4,
Line 59, "from an" should read --from a--.

COLUMN 5,
Line 15, "from an" should read --from a--.

COLUMN 6,
Line 8, "an decision" should read --a decision--.

COLUMN 11,
Line 3, "ken" should read --$\lambda$en--.

COLUMN 12,
Line 18, "Operation 2" should read --¶ "Operation 2"--; and
Line 60, "$\lambda$ept" should read --kept--.

COLUMN 15,
Line 37, "$\lambda$ept" should read --kept--.

COLUMN 16,
Line 67, "form" should read --from--.

COLUMN 18,
Line 36, "$\lambda$ept" should read --kept--.

UNITED STATES PATENT AND TRADEMARK OFFICE
CERTIFICATE OF CORRECTION

PATENT NO. : 5,886,802

DATED : March 23, 1999

INVENTOR(S) : MASAO MAJIMJA

It is certified that error appears in the above-indentified patent and that said Letters Patent is hereby corrected as shown below:

COLUMN 26,
Line 66, "claim 17," should read --claim 17, wherein--.

COLUMN 27,
Line 20, "out-put" should be deleted; and
Line 55, "wherein" should read --wherein,--.

COLUMN 28,
Line 20, "wavelengths" should read --wavelengths,--.

Signed and Sealed this

Twenty-third Day of November, 1999

Q. TODD DICKINSON

Attest:

Attesting Officer

Acting Commissioner of Patents and Trademarks